US009989683B2

(12) United States Patent
Kim et al.

(10) Patent No.: US 9,989,683 B2
(45) Date of Patent: Jun. 5, 2018

(54) COLOR FILTER AND DISPLAY DEVICE COMPRISING THE SAME

(71) Applicant: Samsung Display Co. Ltd., Yongin, Gyeonggi-do (KR)

(72) Inventors: Hyun Jin Kim, Pohang-si (KR); Su Jeong Kim, Seoul (KR); Dae Won Lee, Asan-si (KR); Woo Man Ji, Asan-si (KR); Chul Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 117 days.

(21) Appl. No.: 15/082,564

(22) Filed: Mar. 28, 2016

(65) Prior Publication Data
US 2017/0045654 A1 Feb. 16, 2017

(30) Foreign Application Priority Data

Aug. 10, 2015 (KR) .......................... 10-2015-0112313

(51) Int. Cl.
G02B 5/20 (2006.01)
G02B 5/22 (2006.01)
C09B 47/00 (2006.01)
C09B 49/00 (2006.01)
G02F 1/1335 (2006.01)

(52) U.S. Cl.
CPC .............. G02B 5/223 (2013.01); C09B 47/00 (2013.01); C09B 49/00 (2013.01); G02B 5/201 (2013.01); G02F 1/133514 (2013.01); G02F 1/133528 (2013.01); G02F 2001/133519 (2013.01); G02F 2001/133548 (2013.01)

(58) Field of Classification Search
CPC ....... G03F 7/0007; G02B 5/201; G02B 5/223; G02F 1/133514; G02F 1/133516; C09B 47/00; C09B 49/00; C09B 57/00

USPC ....... 430/7; 349/106; 359/885, 891; 252/586
See application file for complete search history.

(56) References Cited

U.S. PATENT DOCUMENTS 4,311,775 A * 1/1982 Regan ..................... C09B 47/08
430/108.21
2008/0112068 A1 * 5/2008 Helber .................. C09B 47/085
359/885

FOREIGN PATENT DOCUMENTS

KR 1020120059513 6/2012
KR 101560406 10/2015
WO 0196344 12/2001

OTHER PUBLICATIONS

Yasuo Tanaka, et al., "Facile Synthesis of Large meso-Pentafluorophenyl-Substituted Expanded Porphyrins", Eur. J. Org. Chem 2008 1341-1349.

* cited by examiner

*Primary Examiner* — John A McPherson
(74) *Attorney, Agent, or Firm* — Cantor Colburn LLP

(57) ABSTRACT

A color filter comprises a red color filter, a green color filter, and a blue color filter, wherein the green color filter comprises a cyan pigment satisfying the following equation:

$$\frac{A2}{A1} = 0$$

where A1 denotes the absorbance of the cyan pigment in a wavelength range of about 600 nm to about 700 nm and A2 denotes the absorbance of the cyan pigment in a wavelength range of about 450 nm to about 500 nm.

11 Claims, 11 Drawing Sheets

COLOR FILTER AND DISPLAY DEVICE COMPRISING THE SAME

This application claims priority to and the benefit of Korean Patent Application No. 10-2015-0112313 filed on Aug. 10, 2015 in the Korean Intellectual Property Office, and all the benefits accruing therefrom under 35 U.S.C. § 119, the entire contents of which are incorporated herein by reference.

BACKGROUND

1. Field of the Invention

The invention relates to a color filter and a display device comprising the same.

2. Description of the Related Art

Display devices are devices visualizing data. In accordance with the progress and maturation of modern information society, there have increasingly been demands for display devices for displaying images, and various flat panel display devices such as a liquid crystal display (LCD), a plasma display panel (PDP), or an organic light-emitting diode (OLED) display have been widely used.

Color filters are optical elements of a display device and realize colors by extracting three colors of red, green, and blue for each pixel. Particularly, the color filters realize a green color by mixing a yellow pigment and a cyan pigment.

SUMMARY

Exemplary embodiments provide a color filter including a novel cyan pigment compound and a display device comprising the color filter.

However, exemplary embodiments are not restricted to those set forth herein. The above and other exemplary embodiments will become more apparent to one of ordinary skill in the art to which the invention pertains by referencing the detailed description given below.

According to an exemplary embodiment, a color filter includes a red color filter, a green color filter, and a blue color filter, wherein the green color filter includes a cyan pigment satisfying the following equation:

$$\frac{A2}{A1} = 0$$

where A1 denotes the absorbance of the cyan pigment in a wavelength range of about 600 nm to about 700 nm and A2 denotes the absorbance of the cyan pigment in a wavelength range of about 450 nm to about 500 nm.

According to another exemplary embodiment, a display device comprises a first light-transmissive substrate, a second light-transmissive substrate and a color filter disposed between the first light-transmissive substrate and the second light-transmissive substrate and comprising a red color filter, a green color filter, and a blue color filter, the green color filter comprising a cyan pigment satisfying the following equation:

$$\frac{A2}{A1} = 0$$

where A1 denotes the absorbance of the cyan pigment in a wavelength range of about 600 nm to about 700 nm and A2 denotes the absorbance of the cyan pigment in a wavelength range of about 450 nm to about 500 nm.

According to the exemplary embodiments, a color filter including a novel cyan pigment compound and a display device comprising the color filter may be provided.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings.

DETAILED DESCRIPTION

Figure 1:
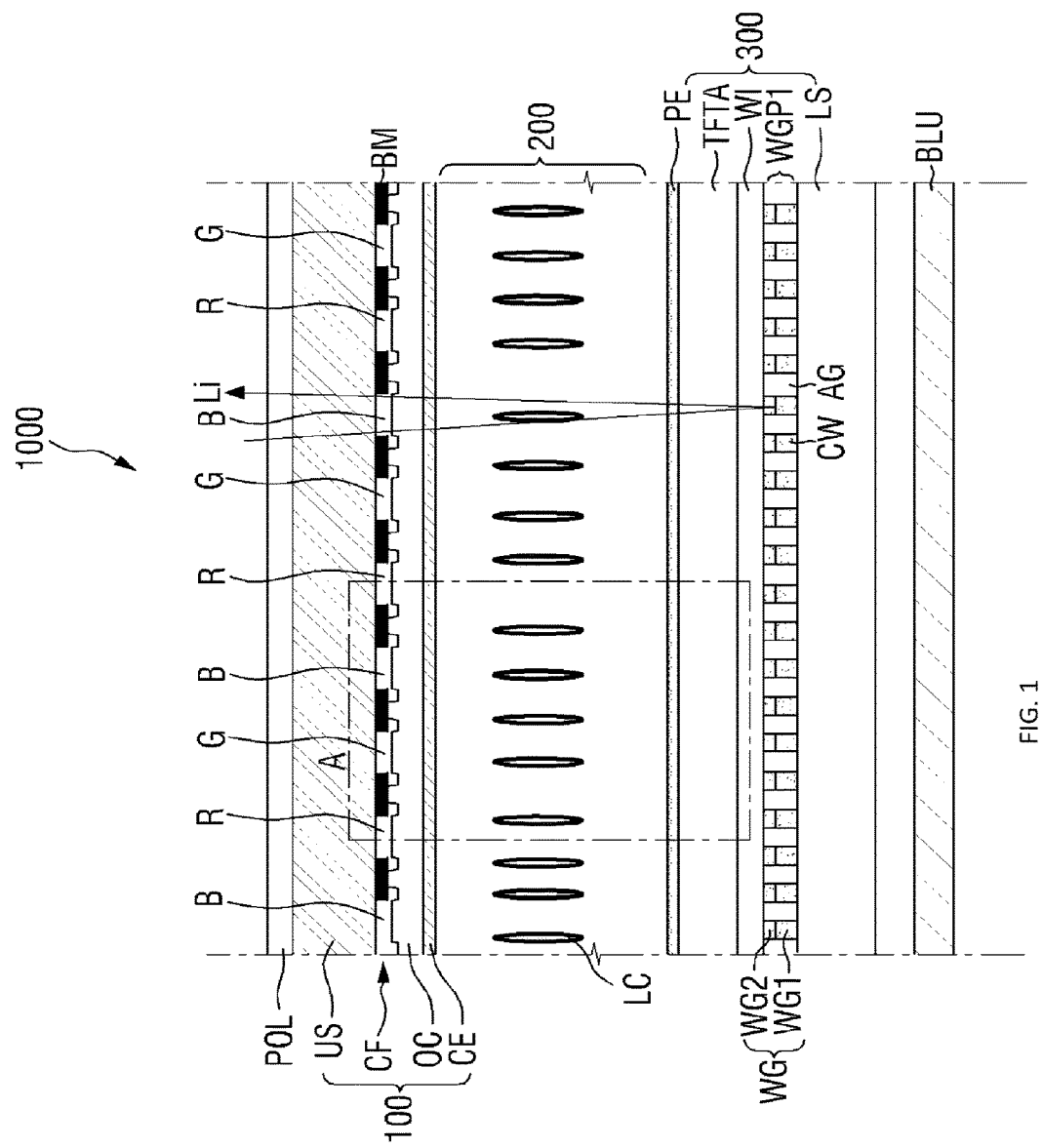
FIG. 1 is a schematic cross-sectional view of a display device according to an exemplary embodiment.

Some embodiments are described with reference to the accompanying drawings. The described embodiments may be embodied in many different forms and should not be construed as being limited to the description set forth herein. In the drawings, sizes of layers and regions may be exaggerated for clarity.

Although the terms "first", "second", etc. may be used herein to describe various elements, these elements should not be limited by these terms. These terms may be used to distinguish one element from another element. Thus, a first element described in this application may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

When a first element is referred to as being "on", "connected to", or "coupled to" a second element, the first element can be directly on, directly connected to, or directly coupled to the second element, or one or more intervening elements may be present. In contrast, when a first element is referred to as being "directly on", "directly connected to", or "directly coupled to" a second element, there are no intervening elements intentionally provided between the first element and the second element. Like numbers may refer to like elements in this application. The term "and/or" includes any and all combinations of one or more of the associated items. "Or" means "and/or."

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used herein, "alkyl" means a straight or branched chain, saturated, monovalent hydrocarbon group (e.g., methyl or hexyl) having the specified number of carbon atoms. "Alkoxy" means an alkyl group that is linked via an oxygen (i.e., alkyl-O—), for example methoxy, ethoxy, and sec-butyloxy groups. "Aryl" means a hydrocarbon group having the specified number of carbon atoms and an aromatic ring, and includes monocyclic and polycyclic hydrocarbons wherein the additional ring(s) of the polycyclic hydrocarbon may be aromatic or nonaromatic (e.g., phenyl or naphthyl). "Vinyl" means an alkyl group having ethylenically unsaturated terminal group (e.g., vinyl, methvinyl, allyl, methallyl or pent-4-en-1-yl). "Vinyloxy" means a vinyl group that is linked via an oxygen, for example allyloxy or pent-4-en-1-oxy groups. "Substituted aryl" means a hydrocarbon group having the specified number of carbon atoms and an aromatic ring wherein at least one of hydrogens in the aromatic ring is substituted with at least one of the alkyl, the alkoxy, the vinyl, the vinyloxy, and includes monocyclic and polycyclic hydrocarbons wherein the additional ring(s) of the polycyclic hydrocarbon may be aromatic or nonaromatic (e.g., phenyl or naphthyl). "Acyl" means means a group having the specified number of carbon atoms, of the formula —C(=O)R wherein R is the alkyl, the alkoxy, the vinyl, the vinyloxy. "Carboxylate ester group" means a group having the specified number of carbon atoms, of the formula —C(O)OR wherein R is an alkyl group. "2-Methylene-alkan-1-one group means a group having the specified number of carbon atoms, of the formula —C(=O)C(CH$_2$=CH$_2$)R wherein R is hydrogen or an alkyl group.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display device 1000 according to an exemplary embodiment will hereinafter be described with reference to FIGS. 1 to 7.

Figure 2:
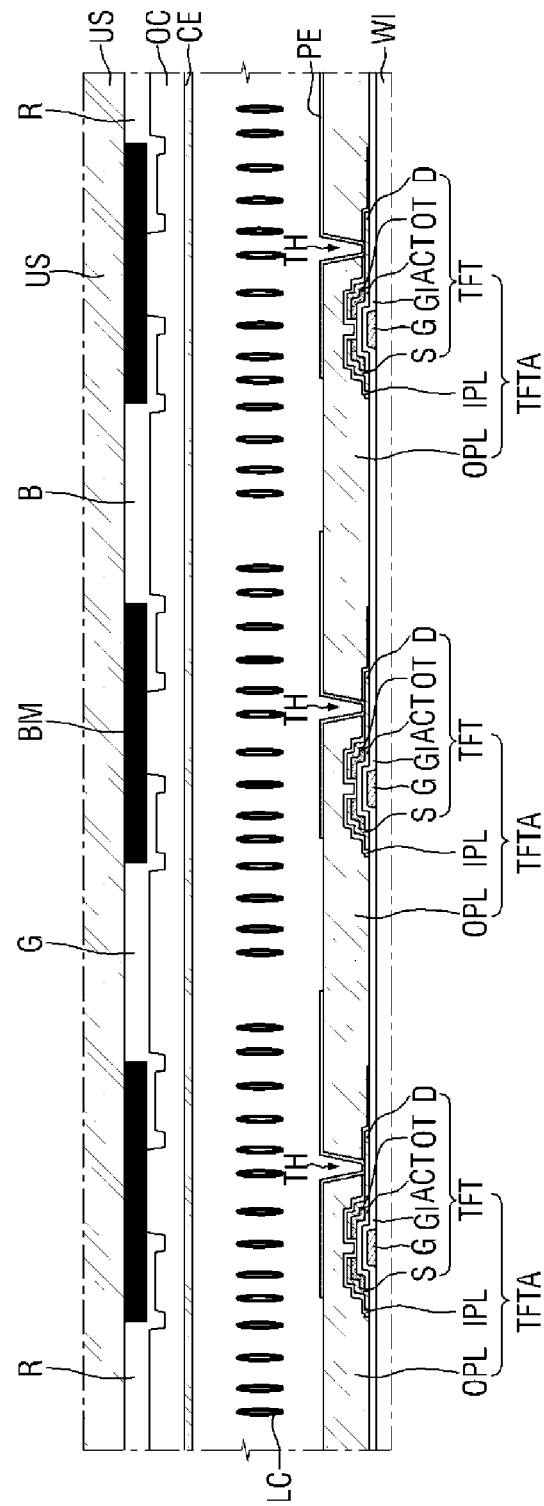
FIG. 2 is an enlarged view of a portion A of FIG. 1.

FIG. 1 is a schematic cross-sectional view of the display device 1000. FIG. 2 is an enlarged view of a portion A of FIG. 1.

Referring to FIGS. 1 and 2, the display device 1000 may be, for example, a liquid crystal display (LCD) or an organic light-emitting diode (OLED) display. In the description that follows, it is assumed that the display device 1000 is an LCD, but the invention is not limited thereto.

The display device 1000 may include a first display substrate 100, a liquid crystal layer 200, a second display substrate 300, a backlight unit BLU, and an absorptive polarizing plate POL. The first display substrate 100 and the second display substrate 300 may be bonded together by a seal line (not illustrated), which is formed of a sealant, and the seal line may be provided in a non-display area in the periphery of the first display substrate 100 and the second display substrate 300. The liquid crystal layer 200 is interposed between the first display substrate 100 and the second display substrate 300 and includes liquid crystal molecules LC. The liquid crystal molecules LC may be, for example, liquid crystal molecules LC with negative dielectric anisotropy.

The first display substrate 100 may include a first light-transmissive substrate US, a color filter layer CF, a black matrix BM, an overcoat layer OC, and a common electrode CE. The color filter layer CF and the black matrix BM may be disposed between the first transmissive substrate US and the common electrode CE. The overcoat layer OC may be disposed between the color filter layer CF and the common electrode CE and between the black matrix BM and the common electrode CE.

The second display substrate 300 may include a second light-transmissive substrate LS, a first conductive wire grid polarizing plate WGP1, an insulating layer WI, a thin-film transistor (TFT) array layer TFTA, and a pixel electrode PE. The first conductive wire grid polarizing plate WGP1 may include a conductive wire grid pattern layer WG, which has an air layer AG disposed among conductive barriers CW that are spaced from one another. The conductive wire grid pattern layer WG may be disposed between the second light-transmissive substrate LS and the insulating layer WI. The insulating layer WI may be disposed between the conductive wire grid pattern layer WG and the pixel electrode PE. The TFT array layer TFTA may be disposed between the pixel electrode PE and the insulating layer WI.

The color filter layer CF may include red color filters R, green color filters G, and blue color filters B.

The red color filters R may comprise a well-known red pigment. For example, C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272, or 279 may be used as the red pigment. The red color filters R may also comprise a yellow pigment or an orange pigment.

For example, C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 198, 213, or 214 may be used as the yellow pigment.

For example, C.I. Pigment Orange 36, 43, 51, 55, 59, 61, 71, or 73 may be used as the orange pigment.

The green color filters G may comprise a cyan pigment satisfying Equation 1:

$$\frac{A2}{A1} = 0 \quad \text{Equation 1}$$

where A1 denotes the absorbance of the cyan pigment in a wavelength range of about 600 nanometers (nm) to about 700 nm and A2 denotes the absorbance of the cyan pigment in a wavelength range of about 450 nm to about 500 nm. In other words, the ratio of A2:A1 is vanishingly small, for example less than 0.01, preferably less than 0.005.

The cyan pigment comprises at least one of a compound of Formula I and a compound of Formula II:

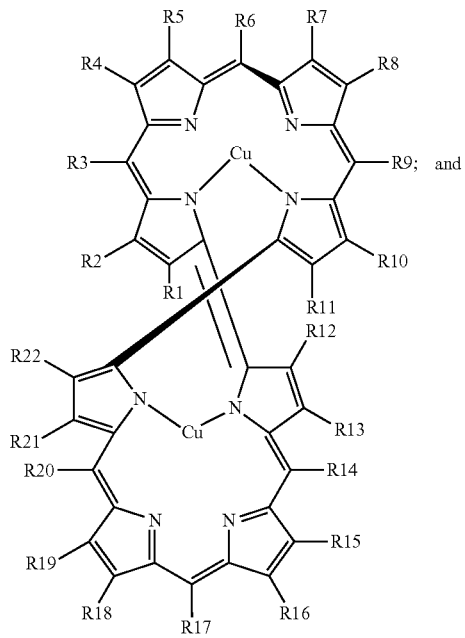

Formula I

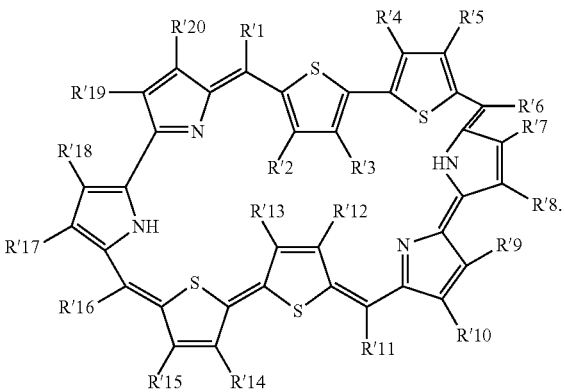

Formula II

Referring to Formula I, each of R1, R2, R3, R4, R5, R6, R7, R8, R9, R10, R11, R12, R13, R14, R15, R16, R17, R18, R19, R20, R21, and R22 is independently one of hydrogen (H), an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 1 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, and a vinyl carboxylate ester aryl group having 6 to 14 carbon atoms in the aryl group and substituted with a vinyl carboxylate ester group having 3 to 10 carbon atoms. To improve the binding force between the compound of Formula I and a carrier, the compound of Formula I may comprise a vinyloxy group or a vinyl carboxylate ester group.

For example, the compound of Formula I may be, but is not limited to, at least one of compounds of Formulas I-1 through I-8:

Formula I-1
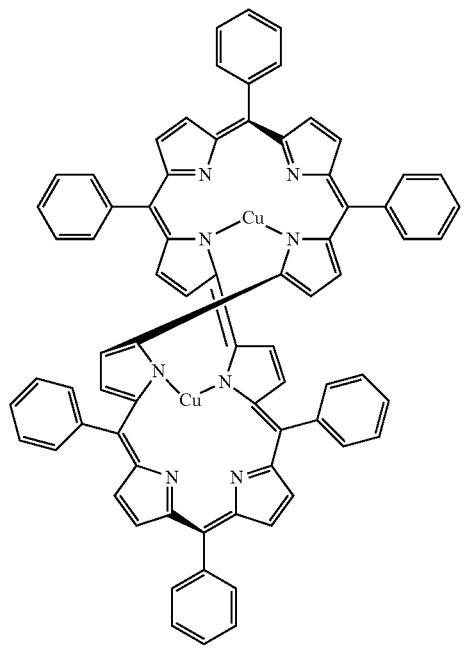
;
Formula I-3
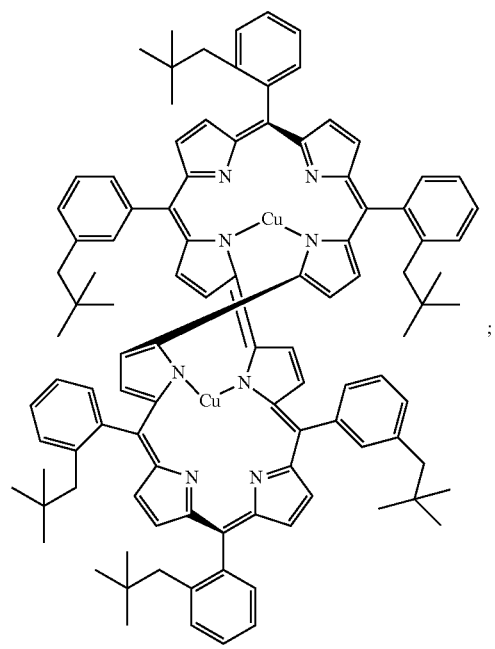
;
Formula I-2
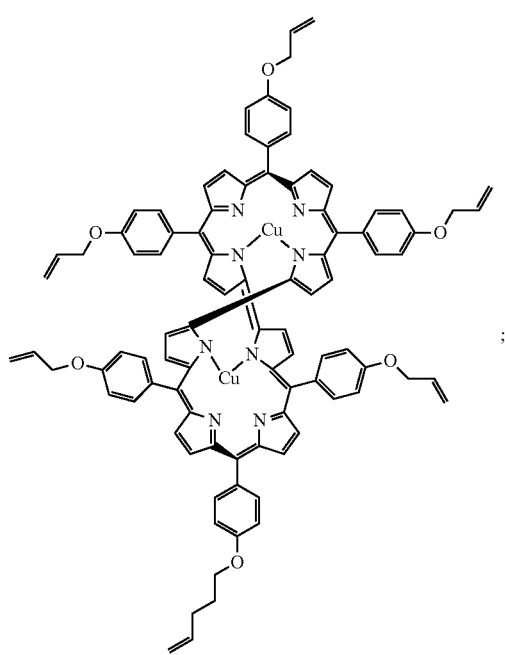
;
Formula I-4
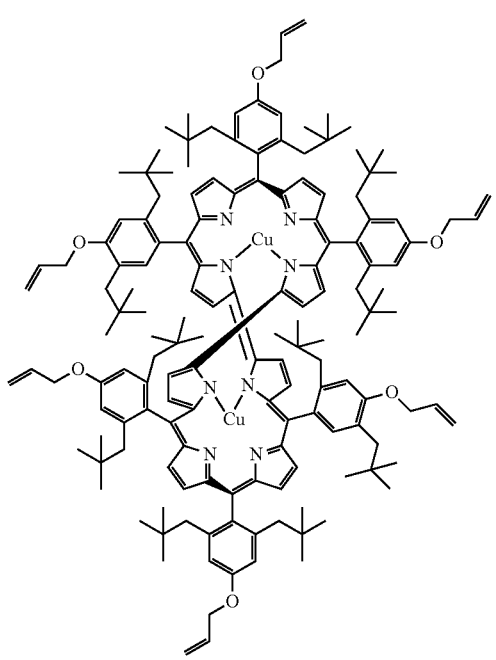
;

Formula I-5

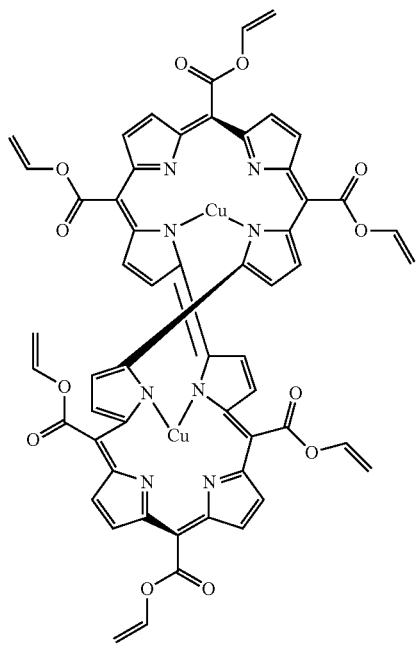

;

Formula I-6

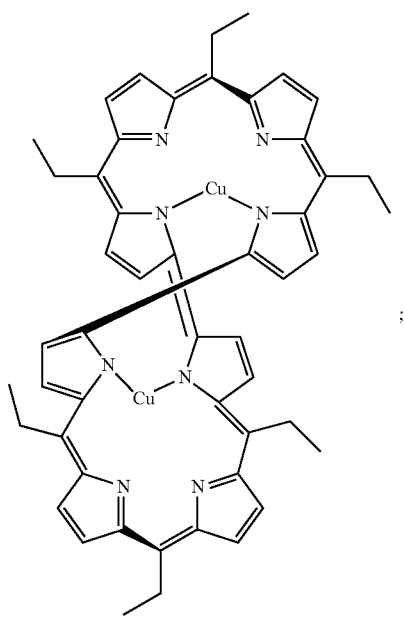

;

Formula I-7

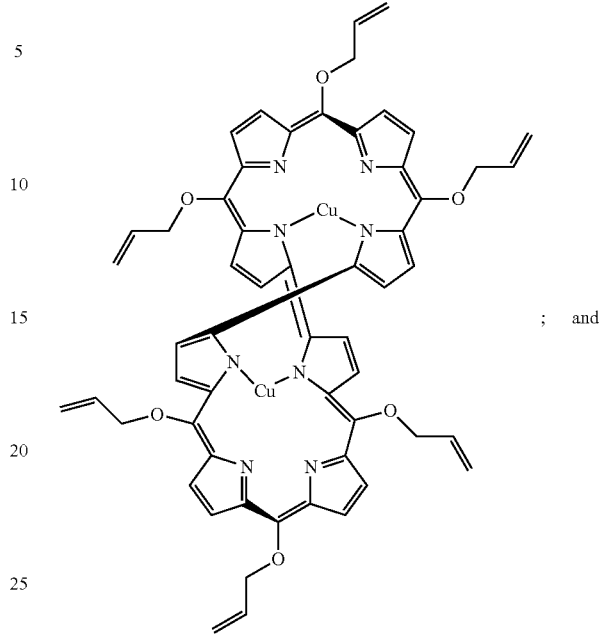

; and

Formula I-8

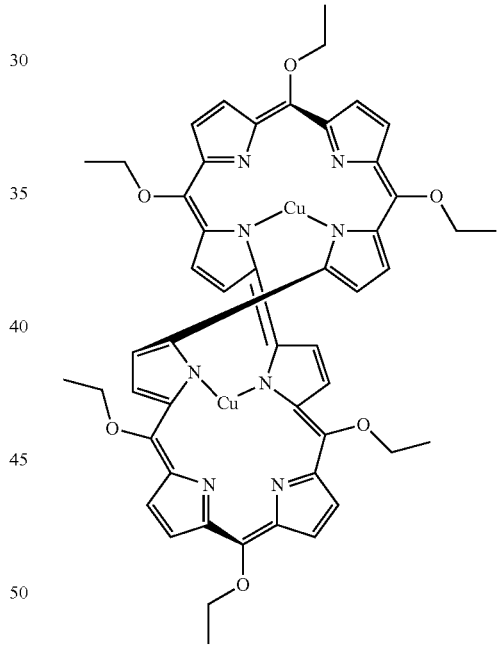

The preparation of the compounds of Formulas I-1 through I-8, for example, bis-Cu octaphyrin, will hereinafter be described.

PREPARATION EXAMPLE 1

Compound of Formula I-1

1.0 equivalent of pyrrole and 0.2 equivalents of benzaldehyde were added to anhydrous dry toluene, the mixture was stirred for five minutes, and a catalystic amount of trifluoroacetic acid was added to the mixture at room temperature as a catalyst. Upon completion of the reaction, dipyrromethane, which was separated and purified by column chromatography, was added to the anhydrous dry toluene, and the mixture was refluxed for 48 hours after the addition of 1.0 equivalent of boron trifluoride diethyl etherate ($BF_3$-$OEt_2$) and 1.0 equivalent of 2,3-dichloro-5,6-dicyano-1,4-benzoquinone (DDQ) thereto.

Octaphyrin, which was separated and purified by column chromatography, was added to anhydrous dry dichloromethane with 5.0 equivalents of sodium acetate (NaOAc) and 10.0 equivalents of copper acetate ($Cu(OAc)_2$) dissolved thereinto, and the mixture was stirred in a dark state at a temperature of about 0° C. for 24 hours after the addition of a catalytic amount of methanol thereto.

A sodium bicarbonate ($NaHCO_3$) solution was added to the stirred mixture to terminate the reaction, an organic layer was dried with sodium sulfate ($Na_2SO_4$), a solvent was removed, and the compound of Formula I-1 was separated by column chromatography.

PREPARATION EXAMPLE 2

Compound of Formula I-2

The compound of Formula I-2 was prepared using the same method as that used in Preparation Example 1 except for using p-allyloxybenzaldehyde, instead of benzaldehyde.

PREPARATION EXAMPLE 3

Compound of Formula I-3

The compound of Formula I-3 was prepared using the same method as that used in Preparation Example 1 except for using o-neopentylbenzaldehyde, instead of benzaldehyde.

PREPARATION EXAMPLE 4

Compound of Formula I-4

The compound of Formula I-4 was prepared using the same method as that used in Preparation Example 1 except for using para-allyloxy-dineopentylbenzaldehyde, instead of benzaldehyde.

PREPARATION EXAMPLE 5

Compound of Formula I-5

The compound of Formula I-5 was prepared using the same method as that used in Preparation Example 1 except for using vinyl para-formylbenzoate, instead of benzaldehyde.

PREPARATION EXAMPLE 6

Compound of Formula I-6

The compound of Formula I-6 was prepared using the same method as that used in Preparation Example 1 except for using propionaldehyde, instead of benzaldehyde.

PREPARATION EXAMPLE 7

Compound of Formula I-7

The compound of Formula I-7 was prepared using the same method as that used in Preparation Example 1 except for using allyl formate, instead of benzaldehyde.

PREPARATION EXAMPLE 8

Compound of Formula I-8

The compound of Formula I-8 was prepared using the same method as that used in Preparation Example 1 except for using ethyl formate, instead of benzaldehyde.

Figure 3:
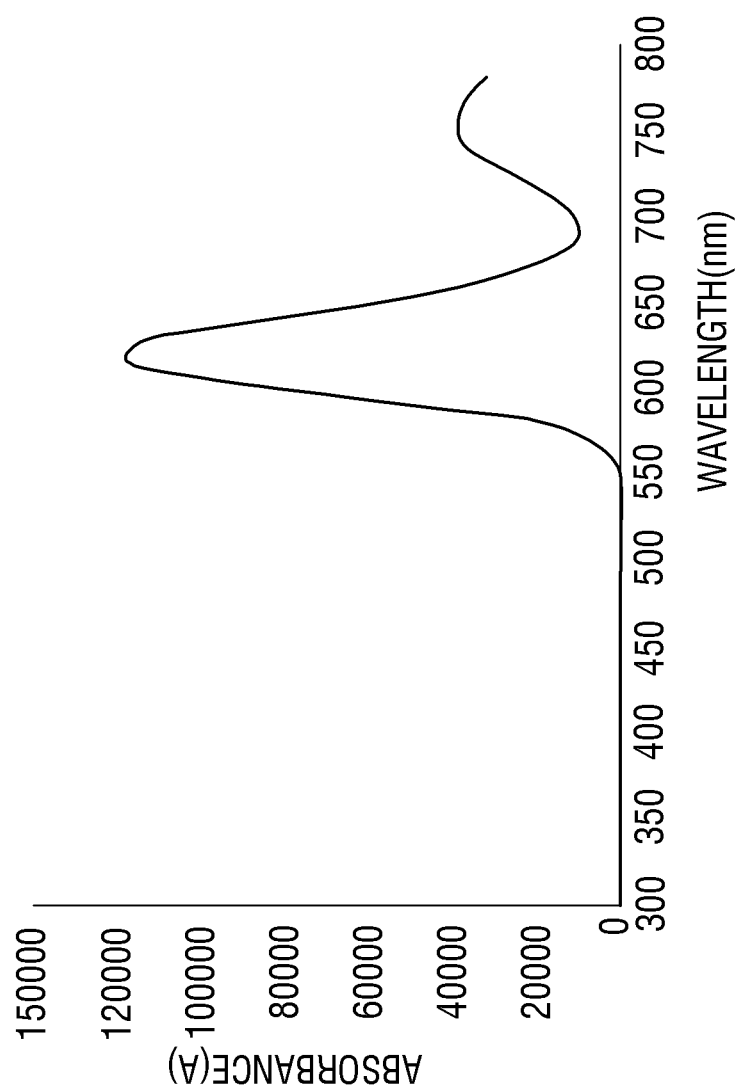
FIG. 3 is an absorption spectrum of a cyan pigment compound according to a first exemplary embodiment in a visible light range.
Figure 4:
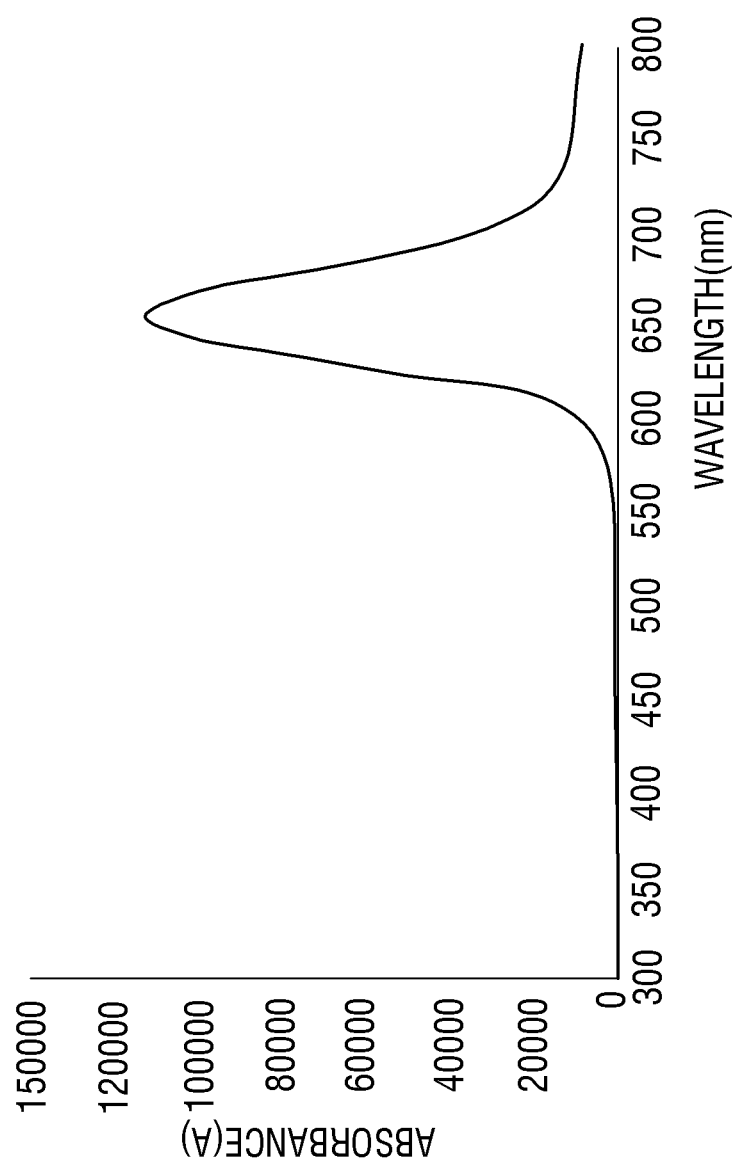
FIG. 4 is an absorption spectrum of a cyan pigment compound according to a second exemplary embodiment in the visible light range.
Figure 5:
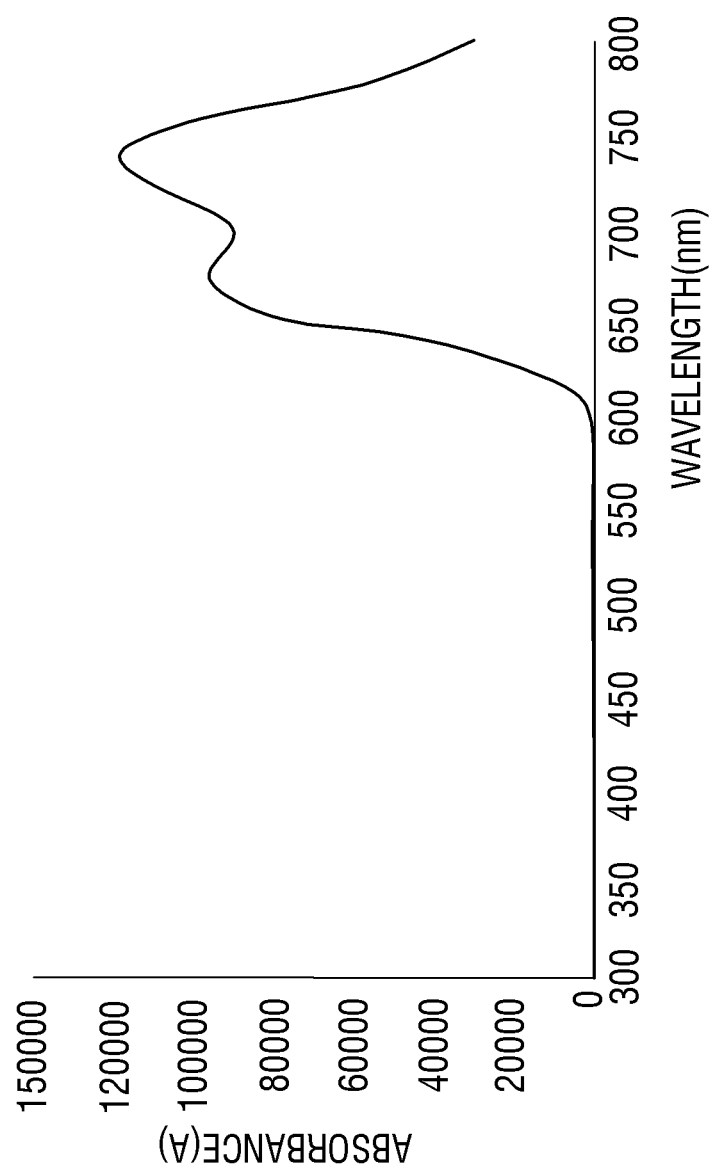
FIG. 5 is an absorption spectrum of a cyan pigment compound according to a third exemplary embodiment in the visible light range.

FIG. 3 is an absorption spectrum of a cyan pigment compound according to a first exemplary embodiment, i.e., a cyan pigment compound of Formula I-1, in a visible light range. FIG. 4 is an absorption spectrum of a cyan pigment compound according to a second exemplary embodiment, i.e., a cyan pigment compound of Formula I-4, in the visible light range. FIG. 5 is an absorption spectrum of a cyan pigment compound according to a third exemplary embodiment, i.e., a cyan pigment compound of Formula I-5, in the visible light range. The absorption spectrums of FIGS. 3 to 5 were obtained by Ultraviolet-Visible (UV-VIS) Spectroscopy.

Referring to FIGS. 3 to 5, the cyan pigment compound of Formula I-1, the cyan pigment compound of Formula I-4, and the cyan pigment compound of Formula I-5 all have an A1-to-A2 ratio of zero. Without being bound by theory, this may be because of a reduced Highest Occupied Molecular Orbital (HOMO)-Lowest Unoccupied Molecular Orbital (LUMO) energy gap due to the coordination bond of copper (Cu) with a ligand.

Referring to Formula II, each of R'1, R'2, R'3, R'4, R'5, R'6, R'7, R'8, R'9, R'10, R'11, R'12, R'13, R'14, R'15, R'16, R'17, R'18, R'19, and R'20 is independently one of H, an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 1 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, a vinyl carboxylate ester aryl group having 6 to 14 carbon atoms in the aryl group and substituted with a vinyl carboxylate ester group having 3 to 10 carbon atoms, and a 2-methylene-alkan-1-one group having 4 to 10 carbon atoms, optionally attached via a phenyl group. To improve the binding force between the compound of Formula II and a carrier, the compound of Formula II may comprise a vinyloxy group having 2 to 10 carbon atoms, a vinyl carboxylate ester group having 3 to 10 carbon atoms, or a 2-methylene-alkan-1-one group having 4 to 10 carbon atoms, optionally attached via a phenyl group.

The compound of Formula II may be, but is not limited to, one of compounds of Formulas II-1 through II-6:
Formula II-1
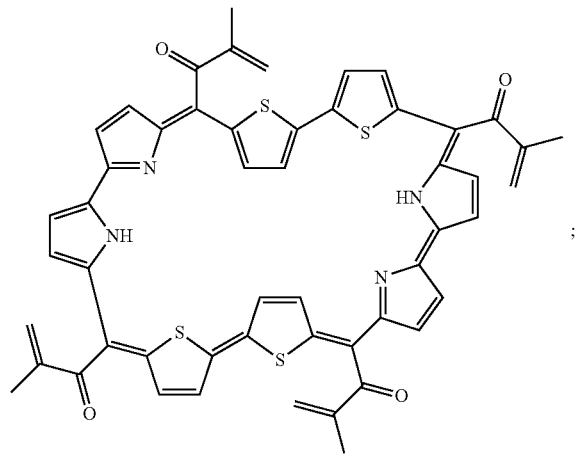
Formula II-2
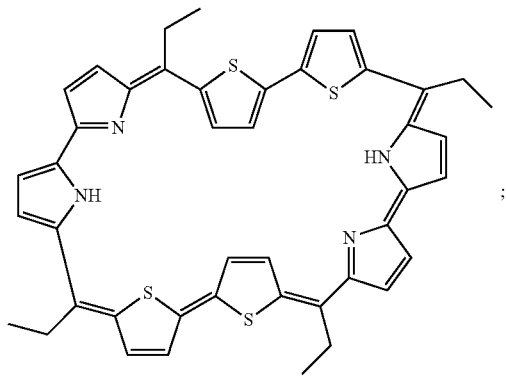
;
Formula II-3
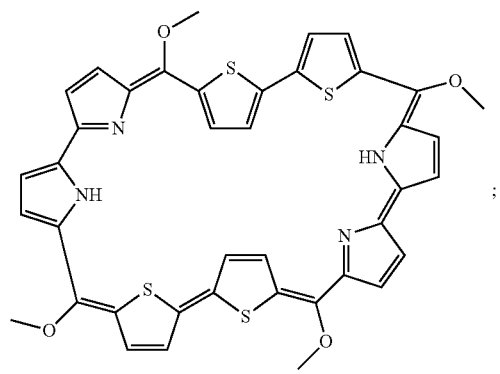
;
Formula II-4
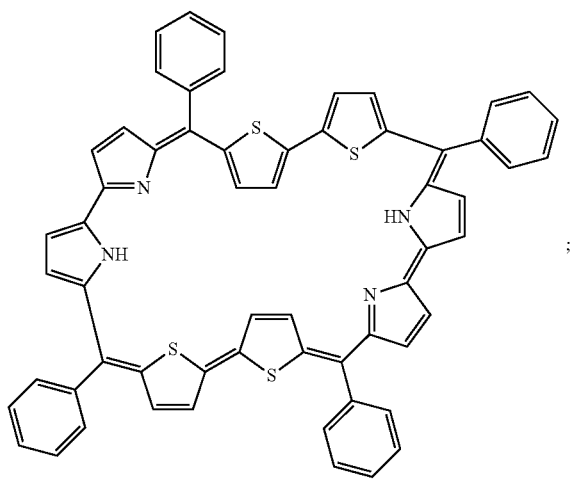
;
Formula II-5
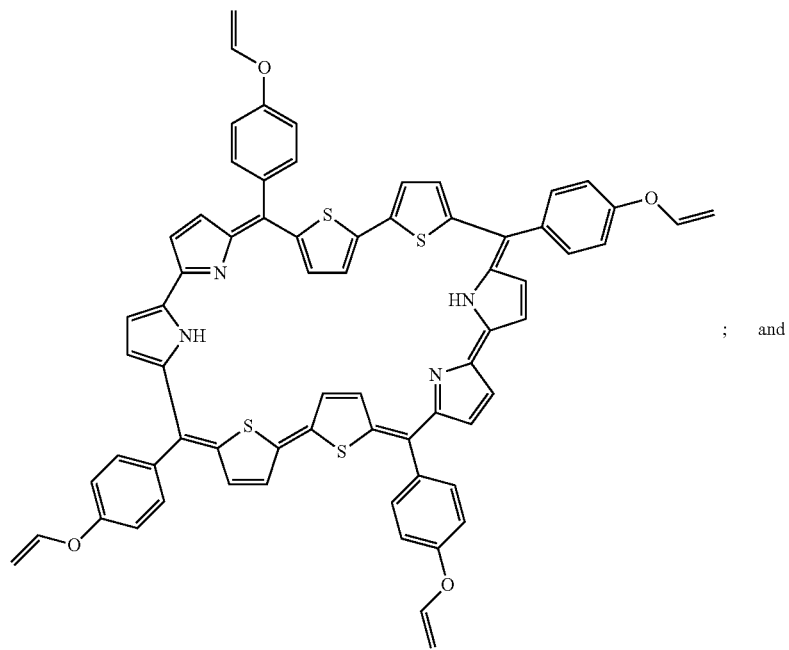
; and Formula II-6

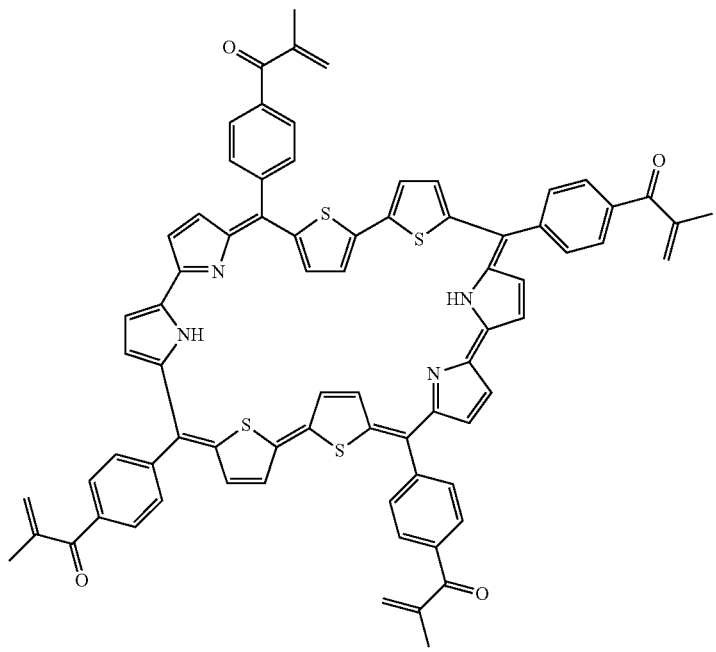

PREPARATION EXAMPLE 9

Compound of Formula II-1

2.0 equivalents of bithiophene, 1.0 equivalent of tetramethylethylenediamine (TMEDA), and 2.0 equivalents of n-butyllithium (n-BuLi) were added to tetrahydrofuran (THF) at low temperature, the mixture was stirred for ten minutes and then stirred at room temperature for another hour, and 2.0 equivalents of methyl oxobutanal dissolved in THF at room temperature was slowly added.

The mixture was stirred at room temperature for another three hours, and bithiophene diol, which was identified by Thin-Layer Chromatography (TLC) and was separated and purified by column chromatography, was dissolved in 2.5 equivalents of pyrrole. Then, 0.1 equivalents of trifluoroacetate (TFA) was added, and the mixture was stirred for one hour. The presence of pyran was identified by TLC, and the pyran was separated by column chromatography.

1.0 equivalent of each of the pyran, the bithiophene diol, and the TFA was dissolved in dichloromethane, the mixture was filled with a nitrogen gas ($N_2$) and was allowed to react in a dark state for one hour, chloranil was added, and the mixture was stirred for one hour was refluxed for one hour, thereby obtaining octaphyrin. The octaphyrin was separated and purified with basic alumina column chromatography using dichloromethane:hexane (1:1).

PREPARATION EXAMPLE 10

Compound of Formula II-2

The compound of Formula II-2 was prepared using the same method as that used in Preparation Example 9 except for using propionic acid aldehyde, instead of methyl oxobutanal.

PREPARATION EXAMPLE 11

Compound of Formula II-3

The compound of Formula II-3 was prepared using the same method as that used in Preparation Example 9 except for using methyl formate, instead of methyl oxobutanal.

PREPARATION EXAMPLE 12

Compound of Formula II-4

The compound of Formula II-4 was prepared using the same method as that used in Preparation Example 9 except for using benzaldehyde, instead of methyl oxobutanal.

PREPARATION EXAMPLE 13

Compound of Formula II-5

The compound of Formula II-5 was prepared using the same method as that used in Preparation Example 9 except for using p-allyloxy-benzaldehyde, instead of methyl oxobutanal.

PREPARATION EXAMPLE 14

Compound of Formula II-6

The compound of Formula II-6 was prepared using the same method as that used in Preparation Example 9 except for using 2-methyl-3-oxo-butyl-benzaldehyde, instead of methyl oxobutanal.

Figure 6:
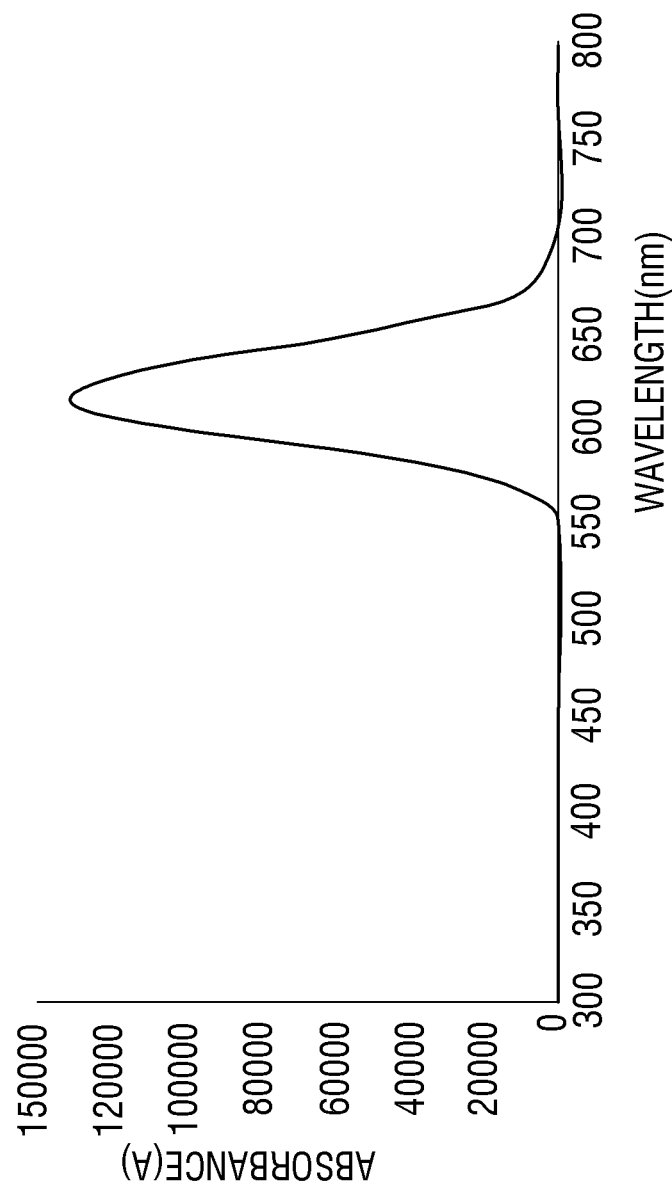
FIG. 6 is an absorption spectrum of a cyan pigment compound according to a fourth exemplary embodiment in the visible light range.

FIG. 6 is an absorption spectrum of a cyan pigment compound according to a fourth exemplary embodiment, i.e., a cyan pigment compound of Formula II-1, in the visible light range. The absorption spectrum of FIG. 6 was obtained by UV-VIS Spectroscopy.

Referring to FIG. 6, the cyan pigment compound of Formula II-1 has an A1-to-A2 ratio of zero.

The green color filters G may also comprise a well-known yellow pigment. For example, C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 198, 213, or 214 may be used as the yellow pigment.

The ratio of the cyan pigment to the yellow pigment may range from about 0.9 to about 1.

The blue color filters B may comprise a well-known blue pigment. For example, C.I. Pigment Blue 15, 15:1, 15:2, 15:3, 15:4, 15:6, 16, 22, 60, or 64 may be used as the blue pigment. The blue color filters B may also comprise a violet pigment. For example, C.I. Pigment Violet 1, 19, 23, 27, 29, 30, 32, 37, 40, 42, or 50 may be used as the violet pigment.

The red color filters R, the green color filters G, and the blue color filters B may be formed by applying a pigment composition comprising the aforementioned pigments, at least one of a thermoplastic polymer, a thermosetting resin, and a photosensitive resin for carrying the pigments, a photoinitiator, a pigment dispersing agent and a surfactant for improving the dispersion of the pigments, a silane coupling agent for improving the binding force between the pigment composition and the first light-transmissive substrate US onto the first light-transmissive substrate US through printing or photolithography.

For example, a butyral polymer, a styrene-maleic acid copolymer, chlorinated polyethylene, chlorinated polypropylene, polyvinyl chloride, a vinyl chloride-vinyl acetate copolymer, polyvinyl acetate vinyl copolymer, a polyurethane, a polyester, an acrylic polymer an alkyd polymer, a polystyrene, a polyamide a rubber, a cyclized rubber, cellulose, polybutadiene, polyethylene, polypropylene, or a polyimide may be used as the thermoplastic polymer.

For example, an epoxy resin, a polyurethane resin, a benzoguanamine resin, a rosin-modified maleic acid resin, a rosin-modified fumaric acid resin, a melamine resin, a urea resin, or a phenol resin may be used as the thermosetting resin.

For example, a resin obtained by reacting a (meth)acrylic compound having a reactive substituent such as an isocyanate group, an aldehyde group, or an epoxy group or cinnamic acid with a linear polymer with a reactive substituent such as a hydroxyl group, a carboxyl group, or an amino group so as to introduce a light crosslinking group such as a (meth)acryloyl group or a styryl group into the linear polymer or a resin obtained by half-esterifying a linear polymer comprising a maleic anhydride copolymer such as styrene-maleic anhydride copolymer or α-olefin-acid anhydride with a (meth)acrylic compound having a hydroxyl group may be used as the photosensitive resin.

For example, an acetophenone photopolymerization initiator such as 4-phenoxy-dichloro acetophenone, 4-t-butyl-dichloro-acetophenone, diethoxyacetophenone, 1-(4-isopropylphenyl)-2-hydroxy-2-methyl-1-one, 1-hydroxy phenyl ketone, 2-methyl-1[4-(methylthio)phenyl]-2-morpholino-1-one, or 2-benzyl-1-(4-morpholinophenyl)-butane-1-one, a benzoin photopolymerization initiator such as benzoin, benzoin methyl ether, benzoin ethyl ether, benzoin isopropyl ether, or benzyl dimethyl ketal, a benzophenone photopolymerization initiator such as benzophenone, benzoyl benzoic acid, benzoyl benzoic acid methyl, 4-phenyl benzophenone, hydroxybenzophenone, acrylated benzophenone, or 4-benzoyl-4'-methyl diphenyl sulfide, a thioxanthone photopolymerization initiator such as thioxanthone, 2-chloro thioxanthone, 2-methyl thioxanthone, isopropyl thioxanthone, or 2,4-diisopropyl thioxanthone, a triazine-based photopolymerization initiator such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl(piperonyl)-6-triazine, or 2,4-trichloromethyl(4'-methoxy styryl)-6-triazine, a borate-based photopolymerization initiator, a carbazole-based photopolymerization initiator, or an imidazole-based photopolymerization initiator may be used as the photoinitiator.

For example, polycarboxylic acid ester such as polyurethane or polyacrylate, unsaturated polyamide, polycarboxylic acid, polycarboxylic acid (partial) amine salt, polycarboxylic acid ammonium salt, polycarboxylic acid alkylamine salt, a polysiloxane (meth)acrylate-styrene copolymer, a (meth)acrylic acid-(meth)acrylate ester copolymer, a styrene-maleic acid copolymer, polyvinyl alcohol, a water-soluble resin or a water-soluble polymer such as polyvinyl pyrrolidone, polyester, an ethylene oxide/propylene oxide addition compound, or phosphate ester may be used alone, or by mixture with one another, as the pigment dispersing agent.

For example, an anionic surfactant such as polyoxyethylene alkyl ether sulfate, sodium dodecylbenzenesulfonate, alkyl naphthalene sulfonate, alkyl diphenyl ether disulfonate, sodium lauryl sulfate, monoethanolamine lauryl sulfate, triethanolamine lauryl sulfate, ammonium stearate, monoethanolamine, sodium stearate, sodium lauryl sulfate, or polyoxyethylene alkyl ether phosphoric acid ester, a nonionic surfactant such as polyoxyethylene oleyl ether, polyoxyethylene lauryl ether, polyoxyethylene nonylphenyl ether, polyoxyethylene alkyl ether phosphoric acid ester, polyoxyethylene sorbitan monostearate, or polyethylene glycol monolaurate, a cationic surfactant such as alkyl quaternary ammonium salt and an ethylene oxide addition product thereof, or an amphoteric surfactant such as alkyl betaine (e.g., alkyl dimethyl amino acetic acid betaine) or alkyl imidazoline may be used alone or by mixture with one another as the surfactant.

For example, vinyl silane such as vinyltris(β-methoxyethoxy)silane, vinyl ethoxysilane, or vinyl trimethoxysilane, (meth)acrylic silane such as γ-methacryloxypropyl trimethoxysilane, epoxy silane such as β-(3,4-epoxycyclohexyl)ethyl trimethoxysilane, β-(3,4-epoxycyclohexyl)methyl trimethoxy silane, β-(3,4-epoxycyclohexyl)ethyl triethoxysilane β-(3,4-epoxycyclohexyl)methyl triethoxy silane, γ-glycidoxypropyltrimethoxysilane, or γ-glycidoxypropyl triethoxysilane, aminosilane such as N-β (aminoethyl)γ aminopropyltrimethoxysilane, N-β(aminoethyl)γ-aminopropyltriethoxysilane, N-(aminoethyl)γ-aminopropyl methyl diethoxy silane, γ-aminopropyltriethoxysilane, γ-aminopropyltrimethoxysilane, N-phenyl-γ-aminopropyltrimethoxysilane, or N-phenyl-γ-aminopropyltriethoxysilane, or thiosilane such as γ-mercaptopropyl trimethoxysilane or γ-mercaptopropyl triethoxysilane may be used as the silane coupling agent.

The material of the first light-transmissive substrate US may be appropriately selected depending on the intended use of the first light-transmissive substrate US or the type of processing that the first light-transmissive substrate US is to be subjected to, as long as it allows the first light-transmissive substrate US to transmit visible light therethrough. The first light-transmissive substrate US may be formed using, for example, various compounds such as glass, quartz, or polymers such as polyether sulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT or TAC), cellulose acetate propionate (CAP), and the like, but the invention is not limited thereto.

The color filter layer CF and the black matrix BM may be disposed on the first light-transmissive substrate US. The black matrix BM may be provided along the boundaries between the red color filters R, the green color filters G, and the blue color filters B on the first light-transmissive substrate US.

The overcoat layer OC may be disposed on the color filter layer CF and the black matrix BM. After the formation of the color filter layer CF and the black matrix BM, the overcoat layer OC may be formed on the color filter layer CF and the black matrix BM, which are alternately provided, to reduce any step differences formed between the color filter layer CF and the black matrix BM. The overcoat layer OC may be formed of an inorganic material such as, for example, silicon oxide or silicon nitride.

The common electrode CE may be disposed on the overcoat layer OC. The common electrode CE may be disposed to face the pixel electrode PE and may form an electric field in the liquid crystal layer 200. The common electrode CE may be formed of indium tin oxide (ITO), indium zinc oxide (IZO), indium oxide, zinc oxide, tin oxide, gallium oxide, titanium oxide, aluminum (Al), silver (Ag), platinum (Pt), chromium (Cr), molybdenum (Mo), tantalum (Ta), niobium (Nb), zinc (Zn), magnesium (Mg), or an alloy or deposition layer thereof.

The material of the second light-transmissive substrate LS may be appropriately selected depending on the intended use of the second light-transmissive substrate LS or the type of processing that the second light-transmissive substrate LS is to be subjected to, as long as it allows the second light-transmissive substrate LS to transmit visible light therethrough. The second light-transmissive substrate LS may be formed using, for example, various polymer compounds such as glass, quartz, PES, PA, PAR, PEI, PEN, PET, PPS, polyallylate, PI, PC, CAT (or TAC), CAP, and the like, but the invention is not limited thereto.

Figure 7:
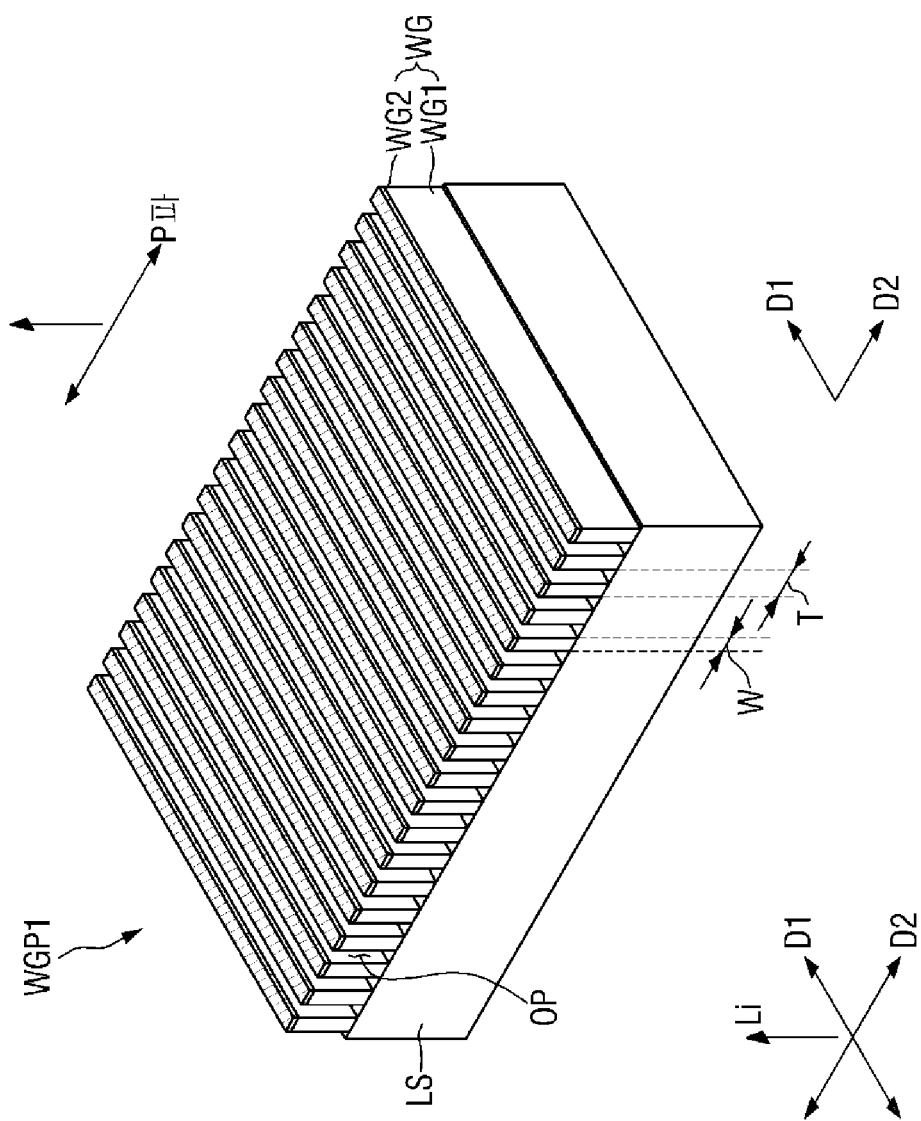
FIG. 7 is a schematic perspective view of a conductive wire grid polarizing plate of FIG. 1.

FIG. 7 is a schematic perspective view of the first conductive wire grid polarizing plate WGP1 of FIG. 1. FIG. 2 is enlarged view of a portion A of FIG. 1.

Referring to FIGS. 1, 2, and 7, the conductive wire grid pattern layer WG may be disposed on the second light-transmissive substrate LS, and may include the conductive barriers CW, which are spaced from one another. The air layer AG may be provided among the conductive barriers CW. For example, the conductive barriers CW may have a linewidth W of about 100 nm or less, have a thickness of about 150 nm, and may be spaced from one another by a distance T of about 100 nm. However, the invention is not limited to this. The conductive wire grid pattern layer WG may be formed by, for example, nano-imprinting.

Light Li incident upon the conductive wire grid pattern layer WG is polarized by the conductive barriers CW. The conductive barriers CW, which are a predetermined distance from each other, transmit therethrough first polarized light and reflects second polarized light, which is perpendicular to the first polarized light. More specifically, among waves of the incident light Li, S waves, which are polarized components parallel to a direction (i.e., a first direction D1) in which the conductive barriers CW extend, are reflected by the conductive barriers CW, and P waves, which are polarized components parallel to a direction (i.e., a second direction D2) perpendicular to the direction in which the conductive barriers CW extend, are transmitted through the conductive barriers CW.

The conductive barriers CW may have a stack structure consisting of a first layer WG1 and a second layer WG2, and the first layer WG1 may be formed of a first transition metal, a first post-transition metal, or an alloy thereof. For example, the first layer WG1 may be formed of a metal such as Al, Cr, gold (Au), Ag, Cu, nickel (Ni), or an alloy thereof. The second layer WG2 may be disposed on the first layer WG1, and may serve as a capping layer for preventing hillocks that may be generated along the interface between the first layer WG1 and the second layer WG2. The second layer WG2 may be formed of a material having a higher etch selectivity than the material of the first layer WG1. For example, the second layer WG2 may be formed of a second transition metal, which is different from the first transition metal. For example, the second transition metal may be one of titanium (Ti), cobalt (Co), Mo, or an alloy thereof.

The insulating layer WI may be disposed between the conductive wire grid pattern layer WG and the TFT array layer TFTA and may insulate the conductive wire grid pattern layer WG and the TFT array layer TFTA from each other. The insulating layer WI may be formed of an inorganic material such as silicon nitride or silicon oxide.

Referring to FIG. 2, the TFT array layer TFTA may include TFTs "TFT" and an organic passivation layer OPL. The structure of a TFT "TFT" will hereinafter be described.

A gate electrode G is disposed on the insulating layer WI, and a gate insulating layer GI is disposed on the gate electrode G. A semiconductor layer ACT is provided in an area of overlap with at least part of the gate electrode G, and ohmic contact layers OT are disposed on the semiconductor layer ACT to be spaced from each other. A source electrode S and a drain electrode D are respectively disposed on the ohmic contact layers OT. An inorganic passivation layer IPL is disposed on the gate insulating layer GI, the source electrode S, the semiconductor layer ACT, and the drain electrode D, and the organic passivation layer OPL is disposed on the inorganic passivation layer IPL.

The pixel electrode PE, which is a field-generating electrode, may be disposed on the organic passivation layer OPL. At least one contact hole TH may be formed on the organic passivation layer OPL, and thus, the pixel electrode PE may be electrically connected to the drain electrode D through the contact hole TH.

Referring to FIG. 1, the absorptive polarizing plate POL may be disposed on the first light-transmissive substrate US. The first light-transmissive substrate US may be disposed between the absorptive polarizing plate POL and the color filter layer CF. Although not specifically illustrated, the absorptive polarizing plate POL may include a polyvinyl alcohol (PVA) polarizing film dyed with iodine and a protective film protecting the PVA film.

The display device 1000 may also include the backlight unit BLU, which is disposed below the second display substrate 300. The backlight unit BLU may include, for example, a light guide plate (not illustrated), a light source (not illustrated), a reflection member (not illustrated), and an optical sheet (not illustrated). The display device 1000 may output an image through the first display substrate 100. That is, an image may be output through the first light-transmissive substrate US.

FIG. 1 illustrates the first conductive wire grid polarizing plate WGP1 as being used as a lower polarizing plate, but the invention is not limited thereto. That is, in an alternative exemplary embodiment, the absorptive polarizing plate POL may be used as a lower polarizing plate. In this alternative exemplary embodiment, the absorptive polarizing plate POL may be disposed between the second light-transmissive substrate LS and the backlight unit BLU, and the insulating layer WI and the first conductive wire grid polarizing plate WGP1 may not be provided.

Figure 8:
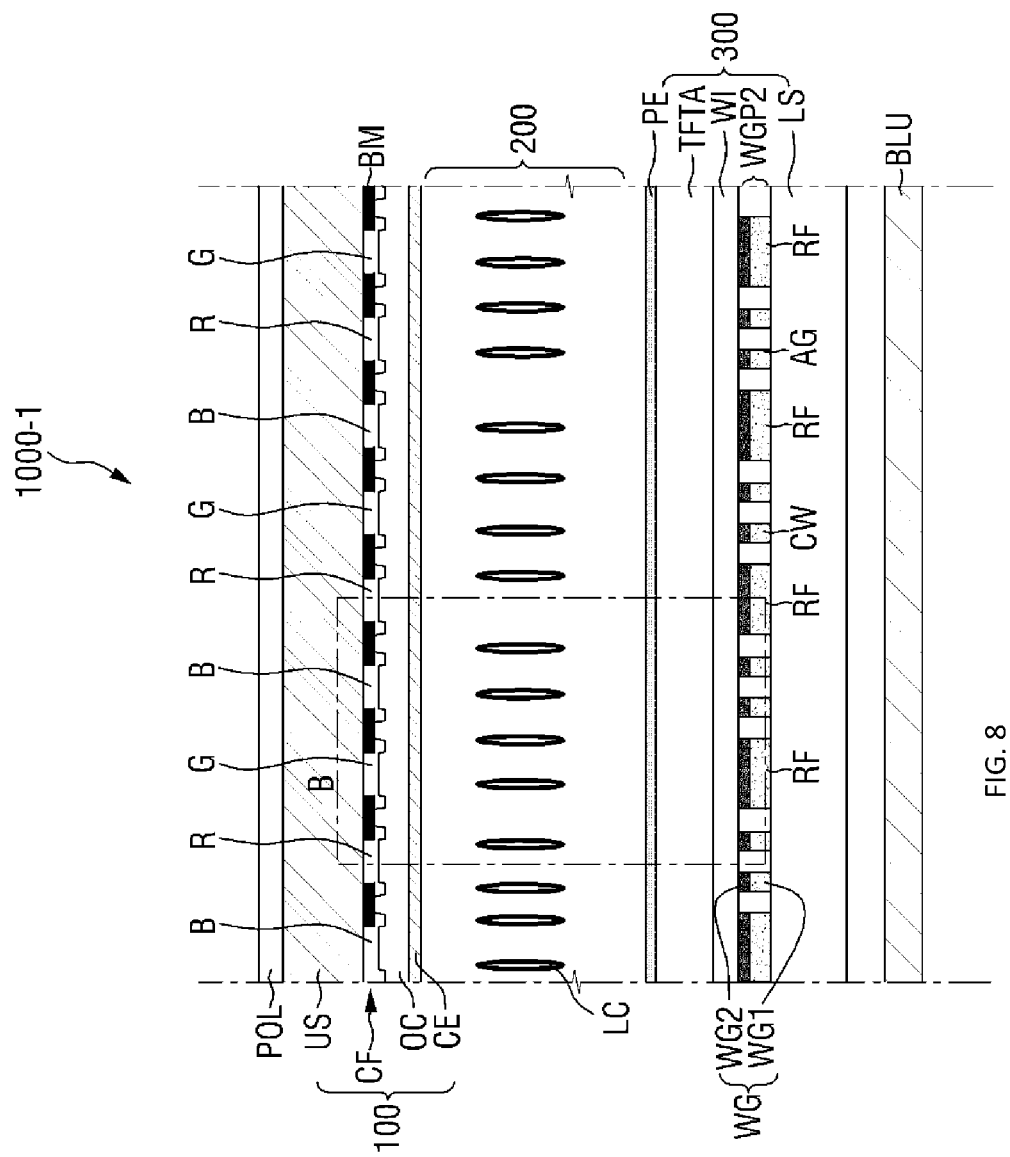
FIG. 8 is a schematic cross-sectional view of a display device according to another exemplary embodiment.
Figure 9:
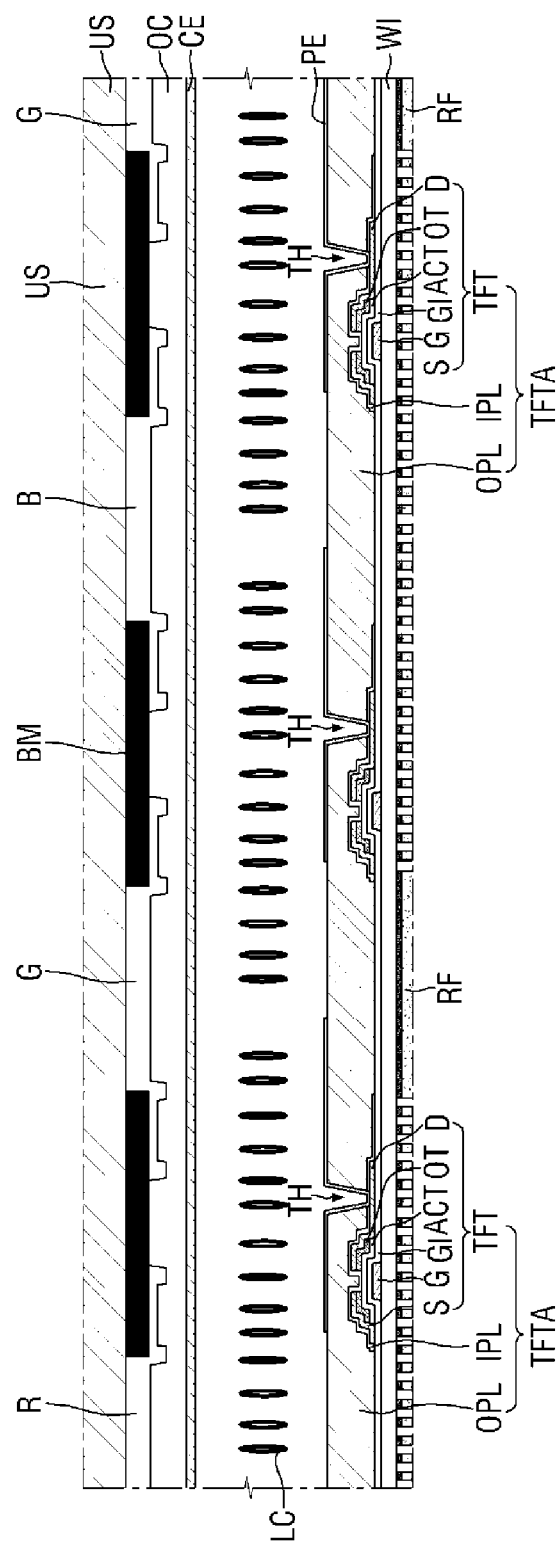
FIG. 9 is an enlarged view of a portion B of FIG. 8.

FIG. 8 is a schematic cross-sectional view of a display device 1000-1 according to another exemplary embodiment. FIG. 9 is an enlarged view of a portion B of FIG. 8.

Referring to FIGS. 8 and 9, the display device 1000-1 differs from the display device 1000 in that it includes a second conductive wire grid polarizing plate WGP2. The second conductive wire grid polarizing plate WGP2, unlike the first conductive wire grid polarizing plate WGP1, further includes reflective patterns RF, which reflect both S waves parallel to a first direction D1 and P waves parallel to a second direction D2. That is, the reflective patterns RF may serve the functions of a reflector, but not the functions of a polarizer.

The reflective patterns RF may have a larger line width than conductive barriers CW, which are provided among the reflective patterns RF to be a predetermined distance from each other and transmit the P waves therethrough while reflecting the S waves.

As described above, the conductive barriers CW may have a stack structure consisting of a first layer WG1 and a second layer WG2. The reflective patterns RF may also have a stack structure consisting of a first layer and a second layer. The first layer WG1 may be formed of a first transition metal, a first post-transition metal, or an alloy thereof. For example, the first layer WG1 may be formed of a metal such as Al, Cr, Au, Ag, Cu, Ni, or an alloy thereof. The second layer WG2 may be disposed on the first layer WG1, and may serve as a capping layer for preventing hillocks that may be generated along the interface between the first layer WG1 and the second layer WG2. The second layer WG2 may be formed of a material having a higher etch selectivity than the material of the first layer WG1. For example, the second layer WG2 may be formed of a second transition metal, which is different from the first transition metal. For example, the second transition metal may be one of Ti, Co, Mo, and an alloy thereof.

In an alternative exemplary embodiment, an absorptive polarizing plate POL, instead of the second conductive wire grid polarizing plate WGP2, may be used as a lower polarizing plate. In this alternative example, the absorptive polarizing plate POL may be disposed between a second light-transmissive substrate LS and a backlight unit BLU, and an insulating layer WI and the second conductive wire grid polarizing plate WGP2 may not be provided.

Figure 10:
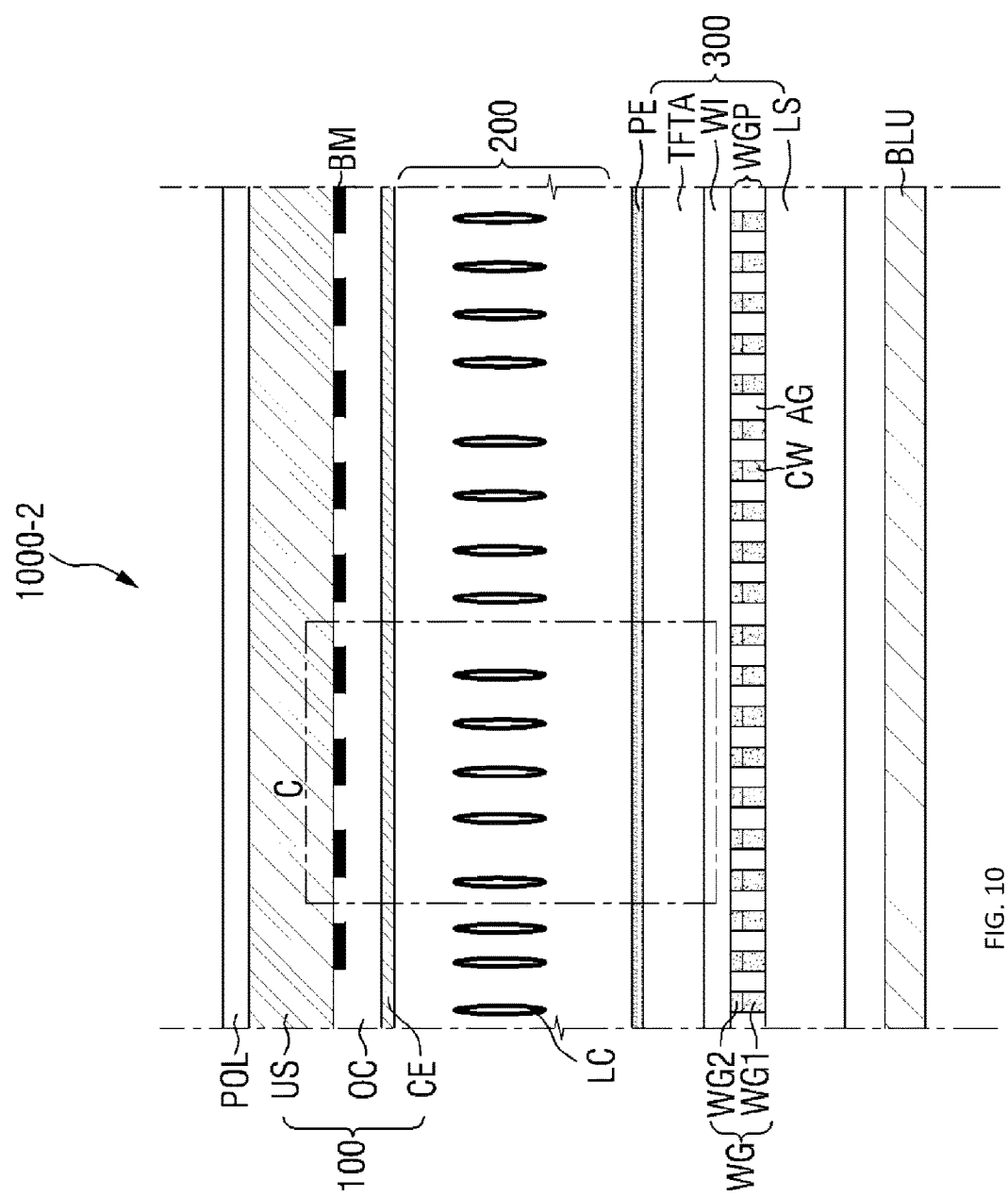
FIG. 10 is a schematic cross-sectional view of a display device according to another exemplary embodiment.
Figure 11:
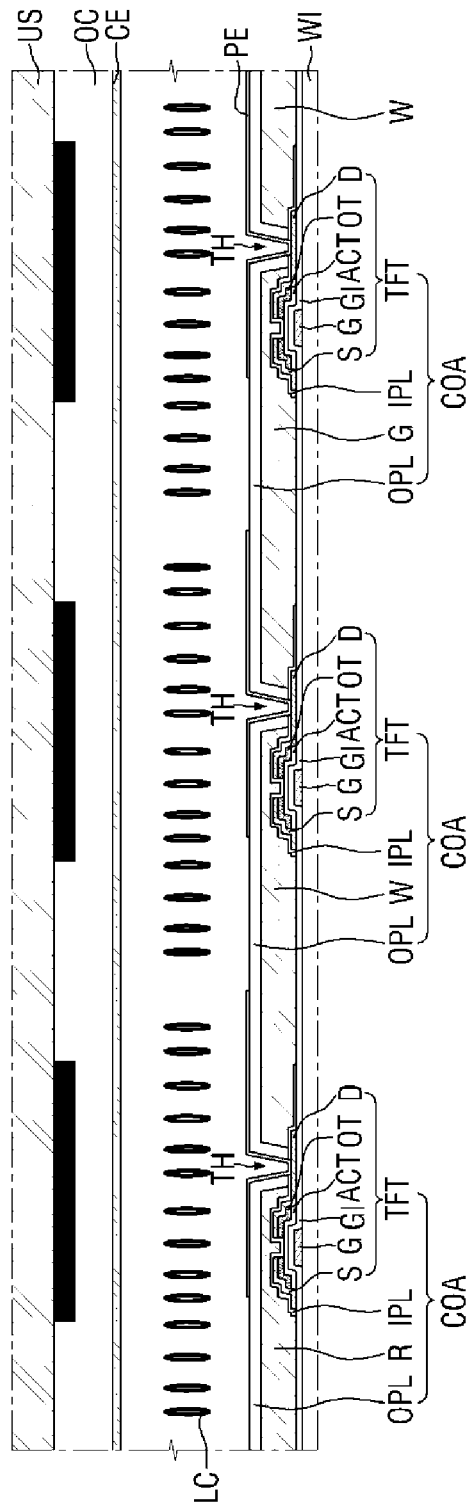
FIG. 11 is an enlarged view of a portion C of FIG. 10.

FIG. 10 is a schematic cross-sectional view of a display device 1000-2 according to another exemplary embodiment. FIG. 11 is an enlarged view of a portion C of FIG. 10.

Referring to FIGS. 10 and 11, the display device 1000-2 differs from the display device 1000 in that a first display substrate 100 includes no color filter layer, and instead, a second display substrate 300 includes a color filter-on-array (COA) layer COA having a color filter layer.

More specifically, in the display device 1000-2, no color filter layer is provided between a first light-transmissive substrate US and a common electrode CE, and a black matrix BM and an overcoat layer OC are provided between the first light-transmissive substrate US and the common electrode CE. The overcoat layer OC is disposed on the black matrix BM and the first light-transmissive substrate US.

The COA layer COA differs from the TFT array layer TFTA of FIG. 1 in that it includes the color filter layer between TFTs "TFT" and an organic passivation layer OPL. More specifically, the COA layer COA includes the color filter layer, which is disposed on an inorganic passivation layer IPL. The color filter layer may be disposed between the inorganic passivation layer IPL and the organic passivation layer OPL and have a structure in which a red color filter R, a white color filter W, a green color filter G, and a white color filter W are alternately arranged. The structure of the TFTs "TFT" has already been described above with reference to FIG. 1, and thus, a detailed description thereof will be omitted.

In the present exemplary embodiment, like in the previous exemplary embodiments, an absorptive polarizing plate POL, instead of a first conductive wire grid polarizing plate WGP1, may be used as a lower polarizing plate.

It will be apparent to those skilled in the art that various modifications and variation can be made in the described embodiments. The described embodiments cover modifications and variations within the scope defined by the appended claims and their equivalents.

What is claimed is:

1. A color filter comprising:
a red color filter, a green color filter, and a blue color filter, wherein the green color filter comprises a cyan pigment satisfying the following equation:

$$\frac{A2}{A1} = 0$$

where A1 denotes the absorbance of the cyan pigment in a wavelength range of about 600 nm to about 700 nm and A2 denotes the absorbance of the cyan pigment in a wavelength range of about 450 nm to about 500 nm, and further wherein the cyan pigment comprises at least one of a compound of Formula I and a compound of Formula II:

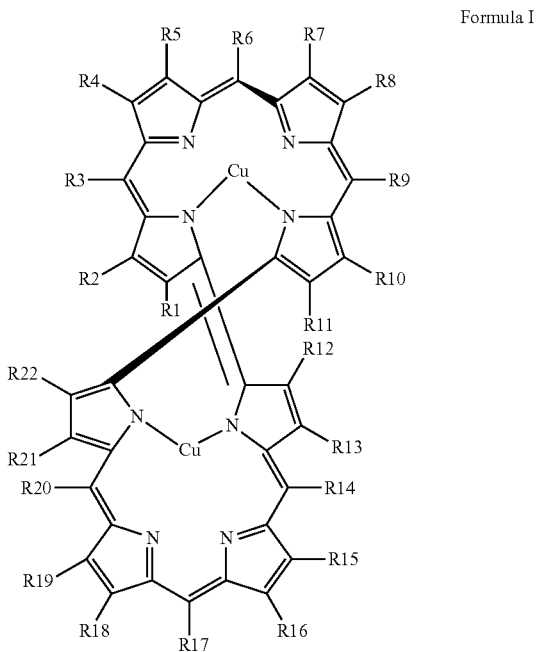

Formula I where each of R1, R2, R3, R4, R5, R6, R7, R8, R9, R10, R11, R12, R13, R14, R15, R16, R17, R18, R19, R20, R21, and R22 is independently one of hydrogen (H), an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, and a vinyl carboxylate ester aryl group having 6 to 14 carbon atoms in the aryl group and substituted with a vinyl carboxylate ester group having 3 to 10 carbon atoms;

Formula II

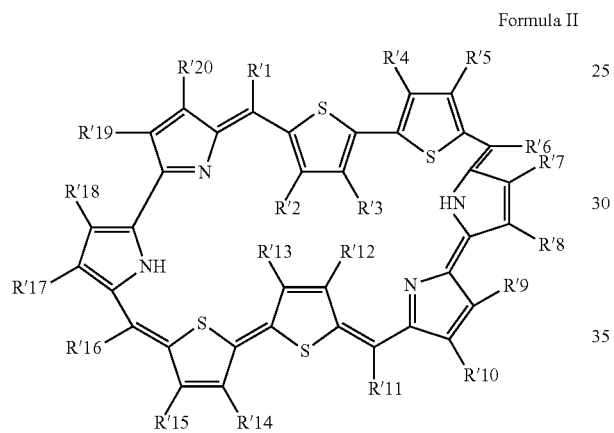

where each of R'1, R'2, R'3, R'4, R'5, R'6, R'7, R'8, R'9, R'10, R'11, R'12, R'13, R'14, R'15, R'16, R'17, R'18, R'19, and R'20 is independently one of H, an alkyl group having 1 to 10 carbon atoms an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, a vinyl carboxylate ester aryl group having 6 to 14 carbon atoms in the aryl group and substituted with a vinyl carboxylate ester group having 3 to 10 carbon atoms, and a 2-methylene-alkan-1-one group having 4 to 10 carbon atoms, optionally attached via a phenyl group.

2. The color filter of claim 1, wherein the green color filter further comprises a yellow pigment.

3. The color filter of claim 1, wherein a ratio of the yellow pigment to the cyan pigment ranges from about 0.9 to about 1.

4. The color filter of claim 1, wherein the compound of Formula I is at least one of compounds of Formula I-1 through I-8:

Formula I-1

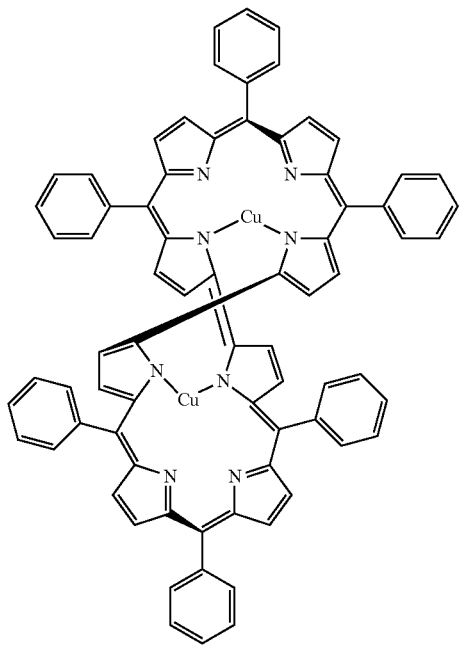

;

Formula I-2

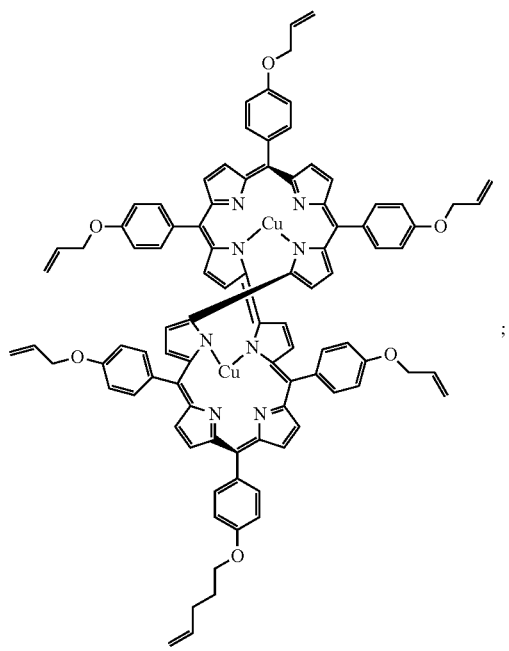

;

Formula I-3
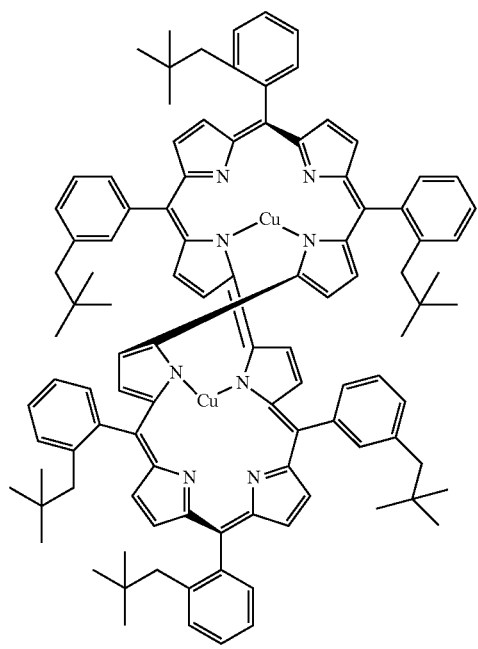
;
Formula I-4
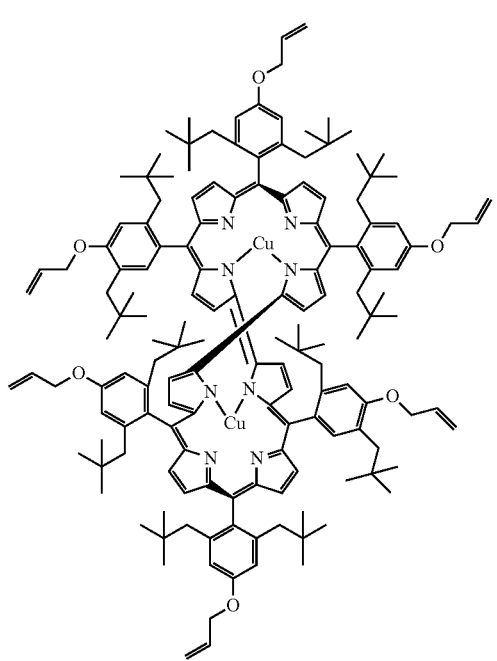
;
Formula I-5
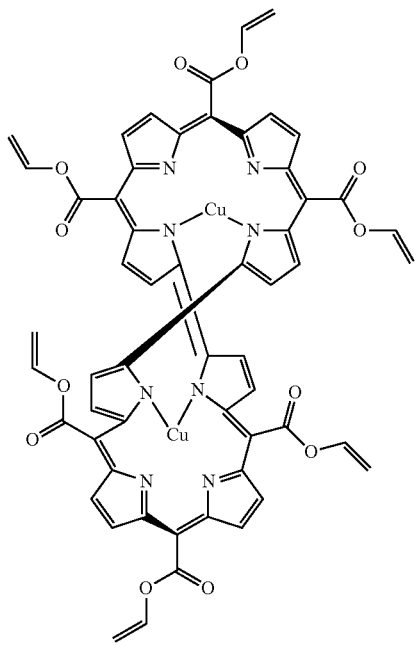
;
Formula I-6
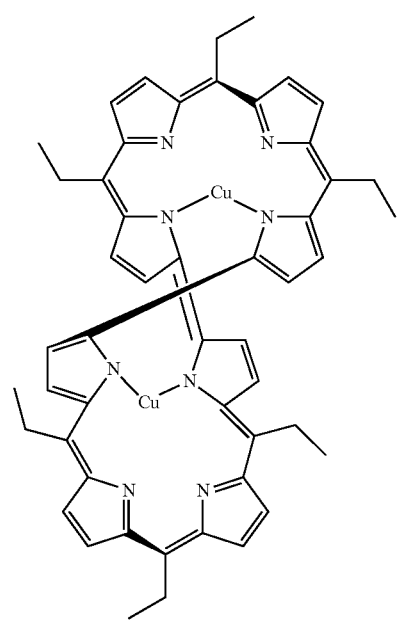
;

-continued
Formula I-7
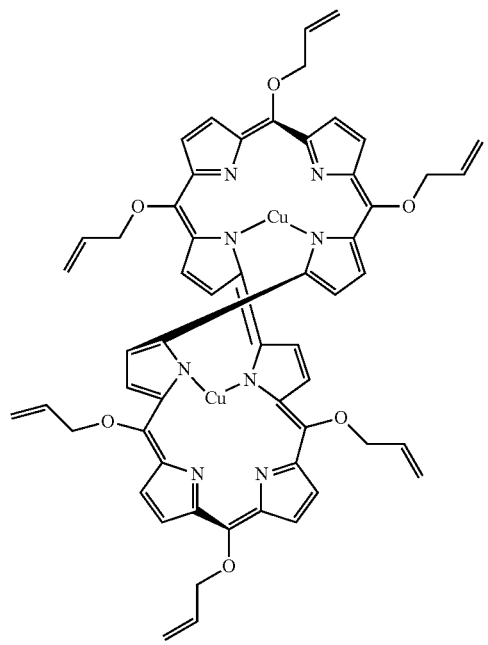
; and
-continued
Formula I-8
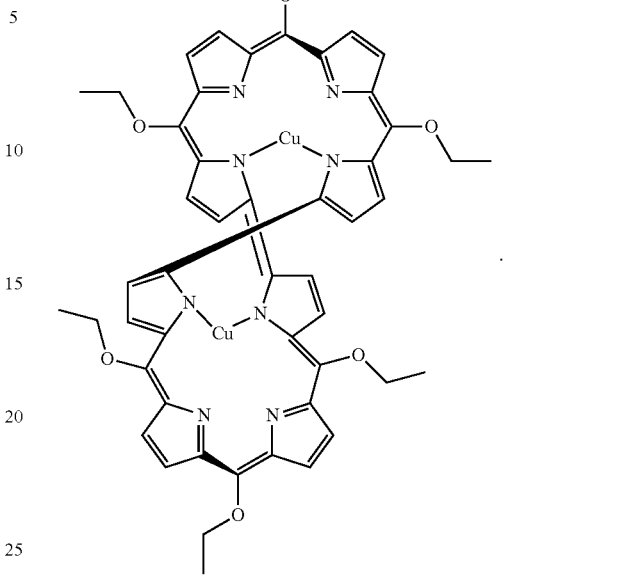
5. The color filter of claim 1, wherein the compound of Formula II is at least one of compounds of Formulas II-1 through II-6:
Formula II-1
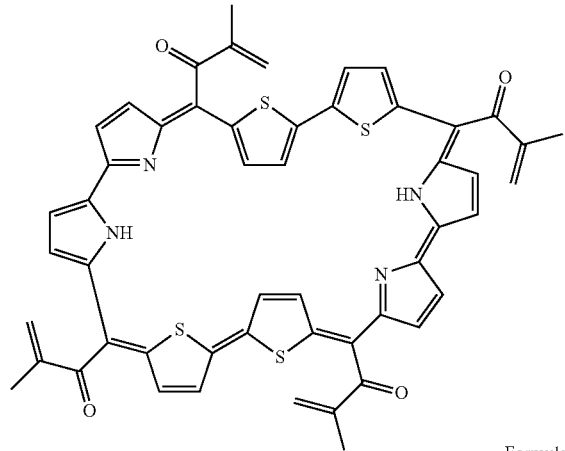
;
Formula II-2
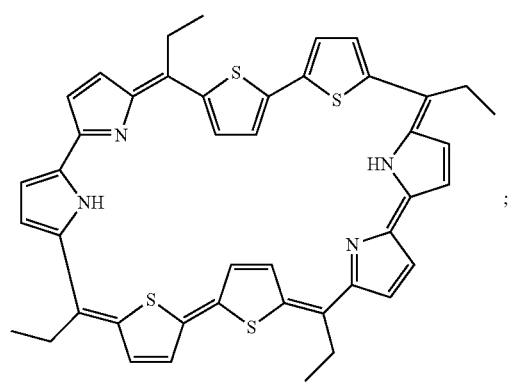
;
Formula II-3
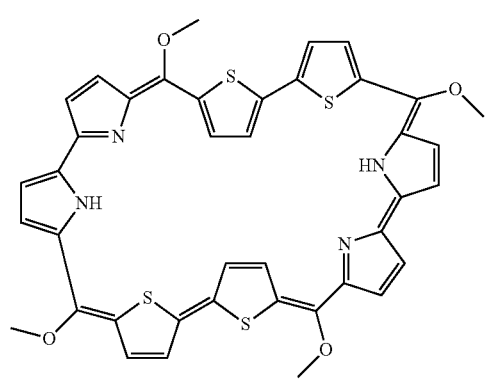
;
Formula II-4
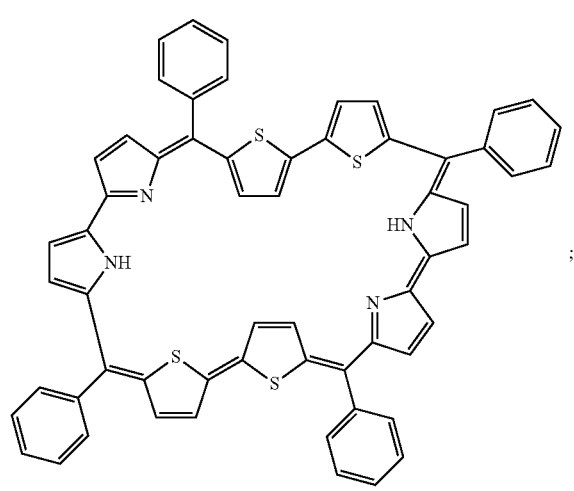
;

Formula II-5

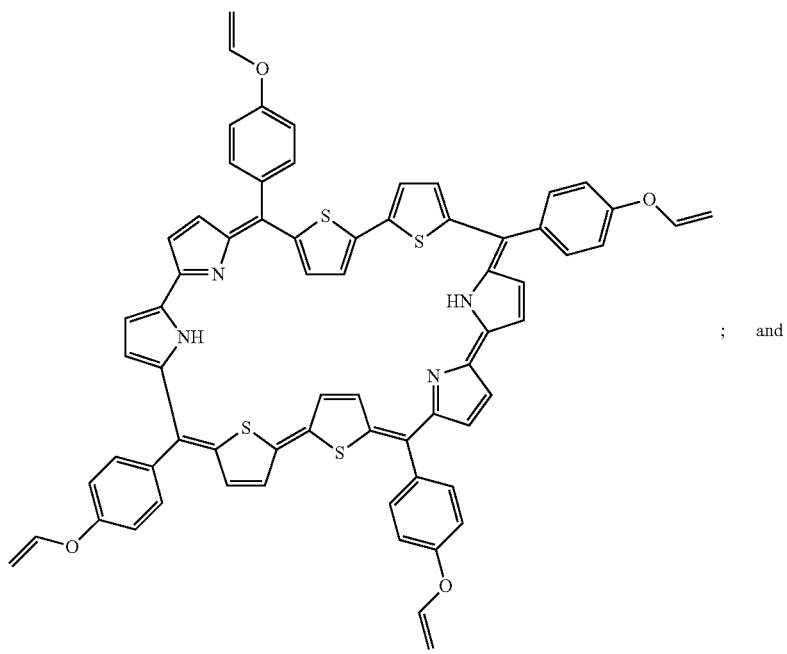

Formula II-6

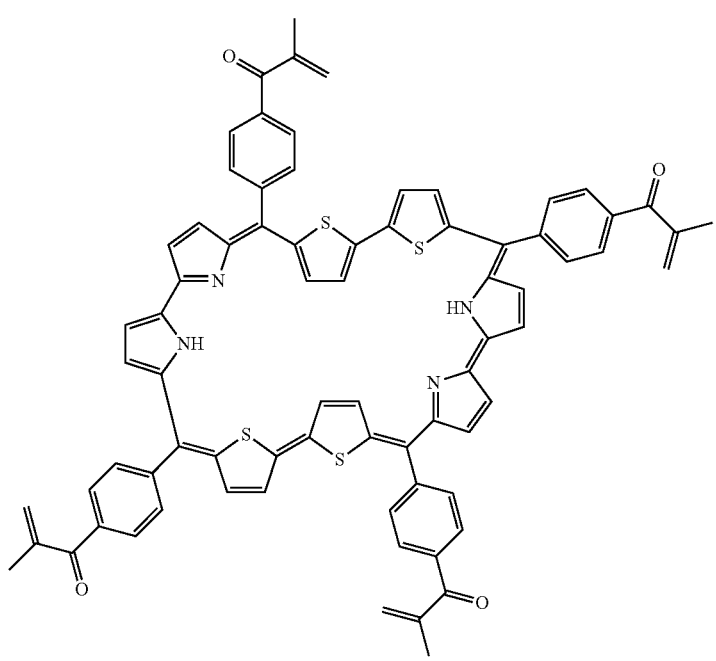

6. A display device comprising:

a first light-transmissive substrate;

a second light-transmissive substrate; and a color filter disposed between the first light-transmissive substrate and the second light-transmissive substrate and comprising a red color filter, a green color filter, or a blue color filter, the green color filter comprising a cyan pigment satisfying the following equation:

$$\frac{A2}{A1} = 0$$

where A1 denotes the absorbance of the cyan pigment in a wavelength range of about 600 nm to about 700 nm and A2 denotes the absorbance of the cyan pigment in a wavelength range of about 450 nm to about 500 nm, and further wherein the cyan pigment comprises at least one of a compound of Formula I and a compound of Formula II:

Formula I

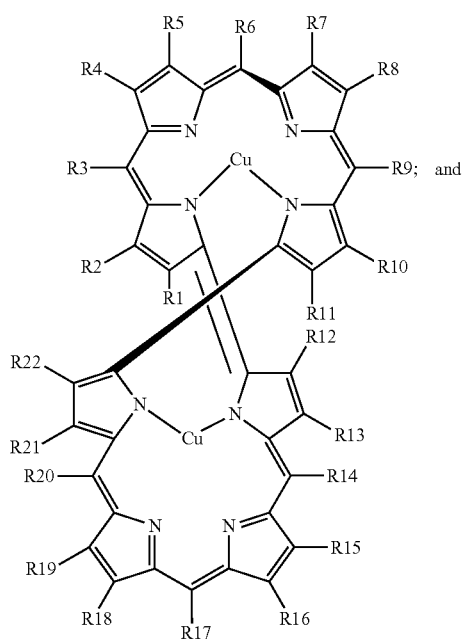

where each of R1, R2, R3, R4, R5, R6, R7, R8, R9, R10, R11, R12, R13, R14, R15, R16, R17, R18, R19, R20, R21, and R22 is independently one of hydrogen (H), an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, and a vinyl carboxylate ester aryl group having 6 to 14 carbon atoms in the aryl group and substituted with a vinyl carboxylate ester group having 3 to 10 carbon atoms;

Formula II

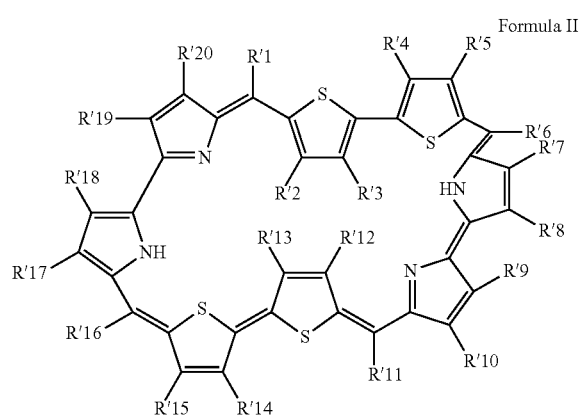

where each of R'1, R'2, R'3, R'4, R'5, R'6, R'7, R'8, R'9, R'10, R'11, R'12, R'13, R'14, R'15, R'16, R'17, R'18, R'19, and R'20 is independently one of H, an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, a vinyl carboxylate ester aryl group having 6 to 14 carbon atoms in the aryl group and substituted with a vinyl carboxylate ester group having 3 to 10 carbon atoms, and a 2-methylene-alkan-1-one group having 4 to 10 carbon atoms, optionally attached via a phenyl group.

7. The display device of claim 6, wherein the green color filter further comprises a yellow pigment.

8. The display device of claim 6, wherein a ratio of the yellow pigment to the cyan pigment ranges from about 0.9 to about 1.

9. The display device of claim 6, wherein the compound of Formula I is at least one of compounds of Formulas I-1 through I-8:

Formula I-1

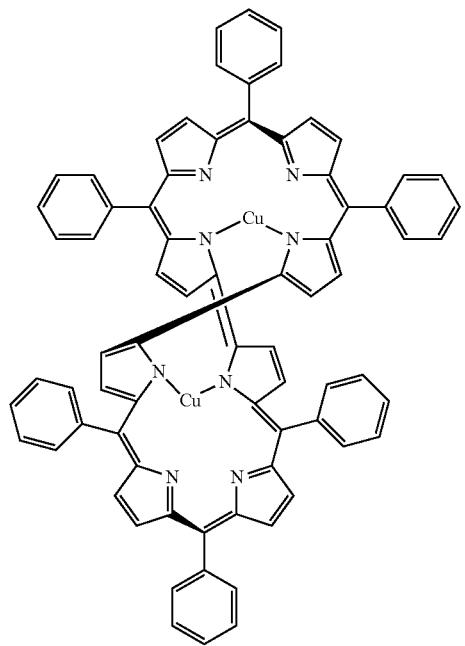

-continued
Formula I-2
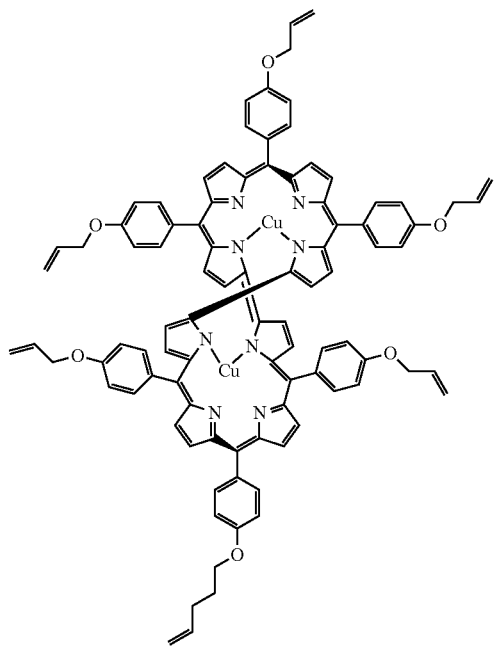
;
Formula I-3
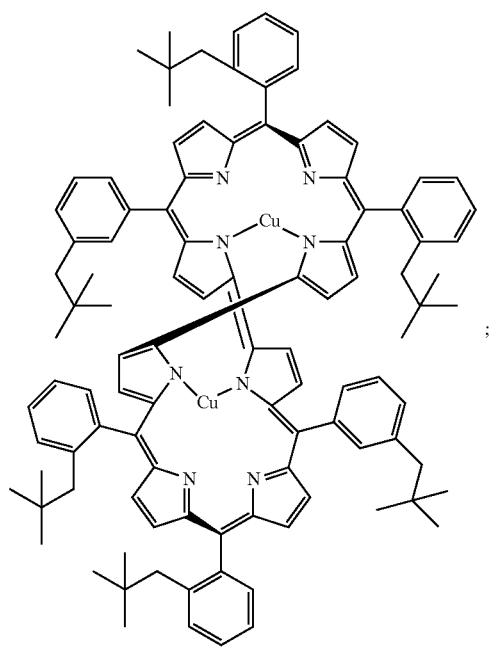
;
-continued
Formula I-4
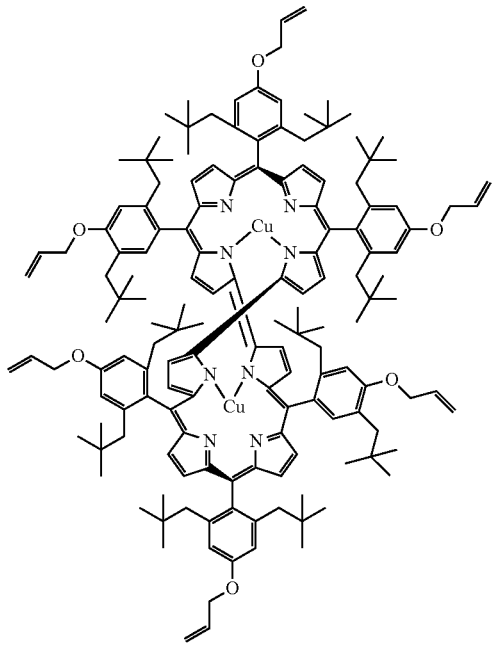
;
Formula I-5
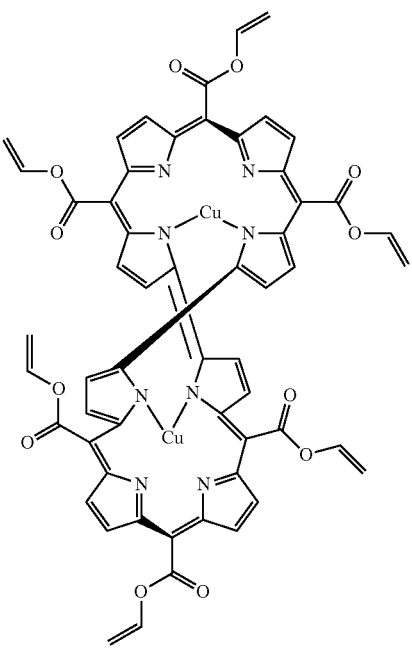
;

Formula I-6
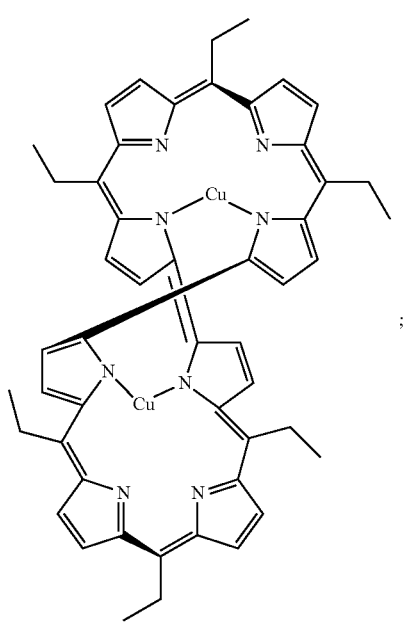
;
Formula I-7
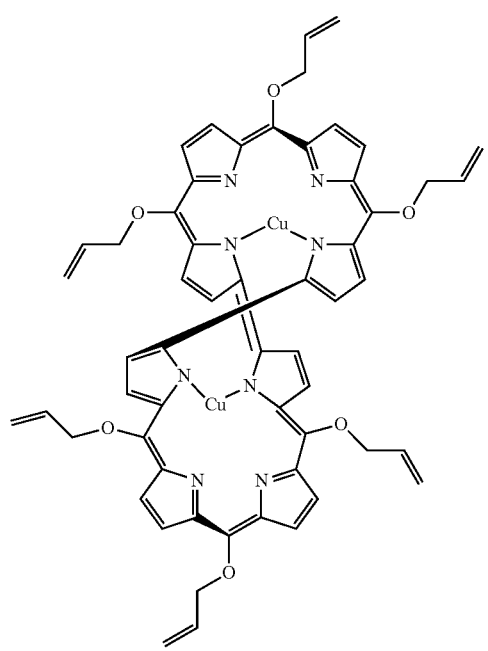
; and
Formula I-8
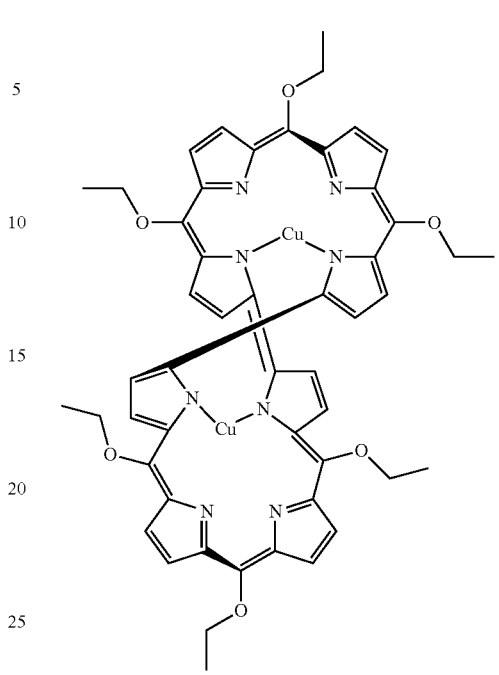
.
10. The display device of claim 6, wherein the compound of Formula II is at least one of compounds of Formulas II-1 through II-6:

Formula II-1
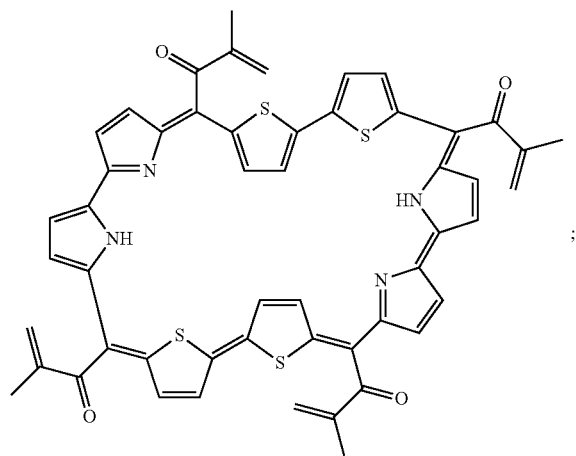
;
Formula II-2
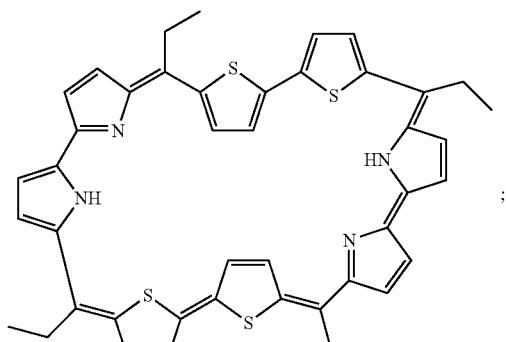
;
Formula II-3
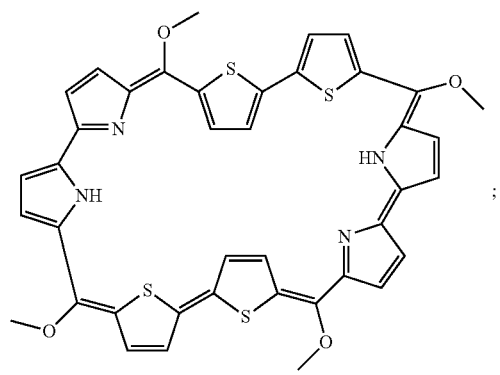
;
Formula II-4
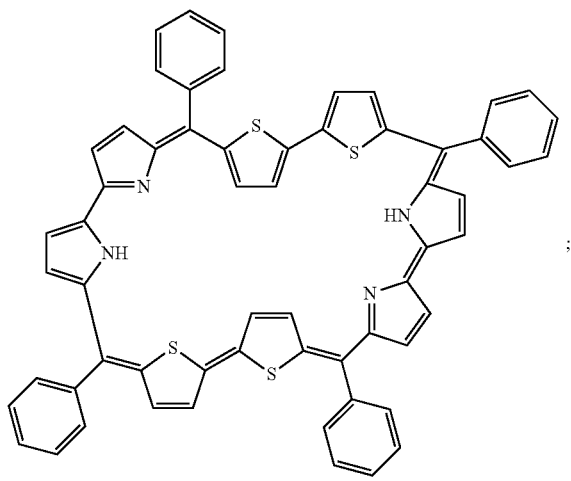
;
Formula II-5
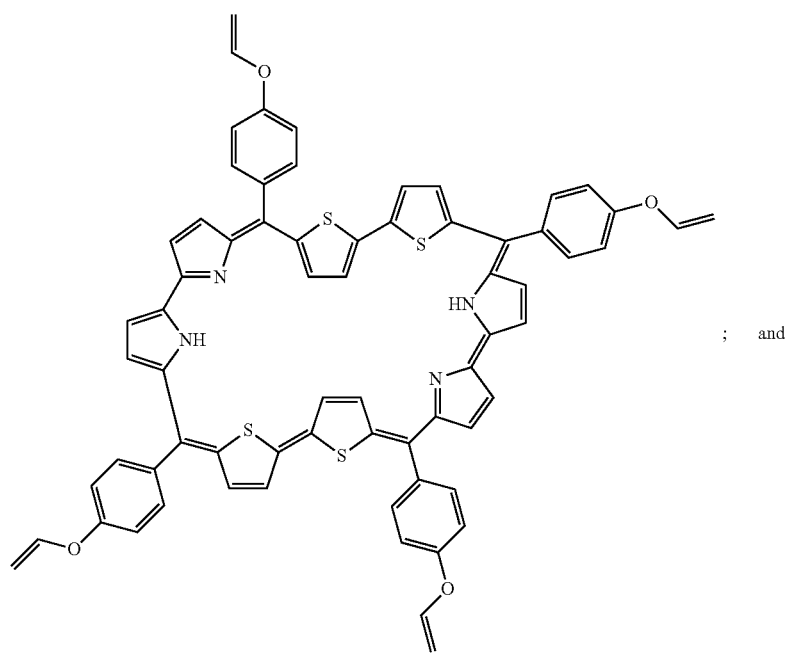
; and Formula II-6

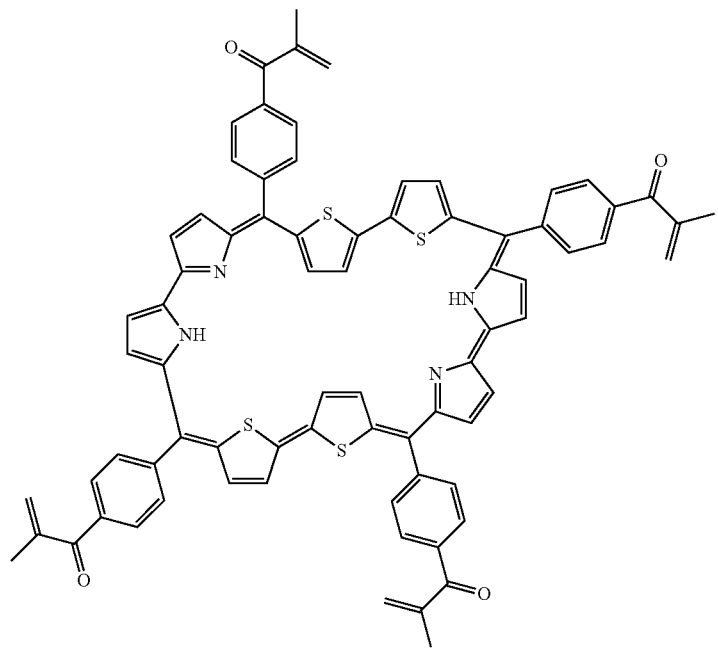

11. A color filter comprising:
a cyan pigment wherein the cyan pigment comprises at least one at least one of a compound of Formula I and a compound of Formula II:

Formula I

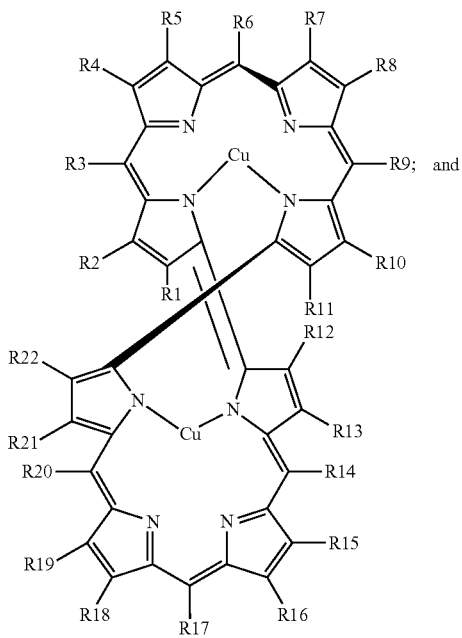

where each of R1, R2, R3, R4, R5, R6, R7, R8, R9, R10, R11, R12, R13, R14, R15, R16, R17, R18, R19, R20, R21, and R22 is independently one of hydrogen (H), an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, and a vinyl carboxylate ester aryl group having 6 to 14 carbon atoms in the aryl group and substituted with a vinyl carboxylate ester group having 3 to 10 carbon atoms;

Formula II

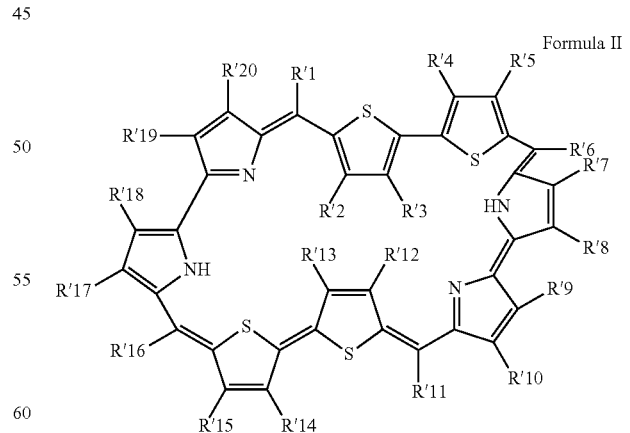

where each of R'1, R'2, R'3, R'4, R'5, R'6, R'7, R'8, R'9, R'10, R'11, R'12, R'13, R'14, R'15, R'16, R'17, R'18, R'19, and R'20 is independently one of H, an alkyl group having 1 to 10 carbon atoms, an alkoxy group having 1 to 10 carbon atoms, a vinyl group having 2 to 10 carbon atoms, a vinyloxy group having 2 to 10 carbon atoms, a carboxylate ester group having 2 to 10 carbon atoms, a vinyl carboxylate ester group having 3 to 10 carbon atoms, an aryl group having 6 to 14 carbon atoms, a substituted aryl group having 6 to 14 carbon atoms in the aryl group and substituted with at least one of an alkyl group having 1 to 10 carbon atoms, an alkoxy group having 1 to 10 carbon atoms, a vinyl group having 2 to 10 carbon atoms and a vinyloxy group having 2 to 10 carbon atoms, an acyl group having 1 to 10 carbon atoms, a vinyloxy aryl group having 6 to 14 carbon atoms in the aryl group that is substituted with a vinyloxy group having 2 to 10 carbon atoms and optionally substituted with an alkyl group having 1 to 10 carbon atoms, a vinyl carboxylate ester aryl group having 6 to 14 carbon atoms in the aryl group and substituted with a vinyl carboxylate ester group having 3 to 10 carbon atoms, and a 2-methylene-alkan-1-one group having 4 to 10 carbon atoms, optionally attached via a phenyl group.

* * * * *